US011454859B1

(12) United States Patent
Cho et al.

(10) Patent No.: US 11,454,859 B1
(45) Date of Patent: Sep. 27, 2022

(54) TRUE TIME DELAY CIRCUIT BASED ON AN OPTICAL WAVEGUIDE SWITCHING ARRAY FOR RF PHASED ARRAY ANTENNA BEAM STEERING

(71) Applicant: U.S. Army Combat Capabilities Development Command, Army Research Laboratory, Adelphi, MD (US)

(72) Inventors: Sang-Yeon Cho, Columbia, MD (US); Weimin Zhou, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 17/308,082

(22) Filed: May 5, 2021

(51) Int. Cl.
*G02F 1/295* (2006.01)
(52) U.S. Cl.
CPC .................................. *G02F 1/2955* (2013.01)
(58) Field of Classification Search
CPC .... G02B 6/2861; H04L 7/0075; G02F 1/2955
See application file for complete search history.

(56) References Cited

U.S. PATENT DOCUMENTS

| 5,455,878 | A | * | 10/1995 | Thaniyavarn | ........ | G02B 6/2861 |
| | | | | | | 385/20 |
| 5,572,611 | A | * | 11/1996 | Jinguji | ................... | G02B 6/136 |
| | | | | | | 385/17 |
| 6,072,923 | A | * | 6/2000 | Stone | ........................ | G02F 1/31 |
| | | | | | | 385/16 |
| 2005/0254542 | A1 | * | 11/2005 | Ahn | ...................... | G02F 1/0118 |
| | | | | | | 250/227.12 |
| 2009/0116785 | A1 | * | 5/2009 | Parker | .................. | G02B 6/2861 |
| | | | | | | 385/24 |

* cited by examiner

*Primary Examiner* — John Bedtelyon
(74) *Attorney, Agent, or Firm* — Alan I. Kalb

(57) ABSTRACT

Time delay devices for producing tunable time delays in optical signals. Cascades of the time delay devices can be used for beam steering in phased-array antennas. The time delay may be produced by selecting a time delay between an input and output of the time delay device from any of the time delay obtained by all four-port switches of the time delay device being in an OFF state and time delays obtainable by switching any one of the four-port switches to an ON state; and producing the selected time delay between the input and output of the time delay device by performing any of avoiding an application of an electrical control signal to any of electro-optic switch elements of the time delay device and applying the electrical control signal to one of the electro-optic switch elements that corresponds to a four-port coupler corresponding to the selected time delay.

20 Claims, 13 Drawing Sheets

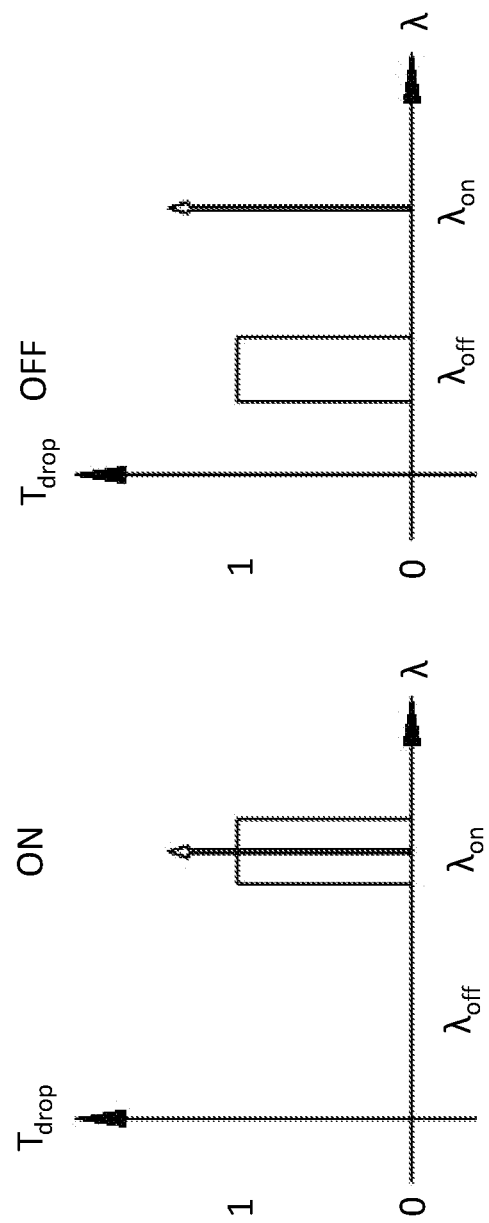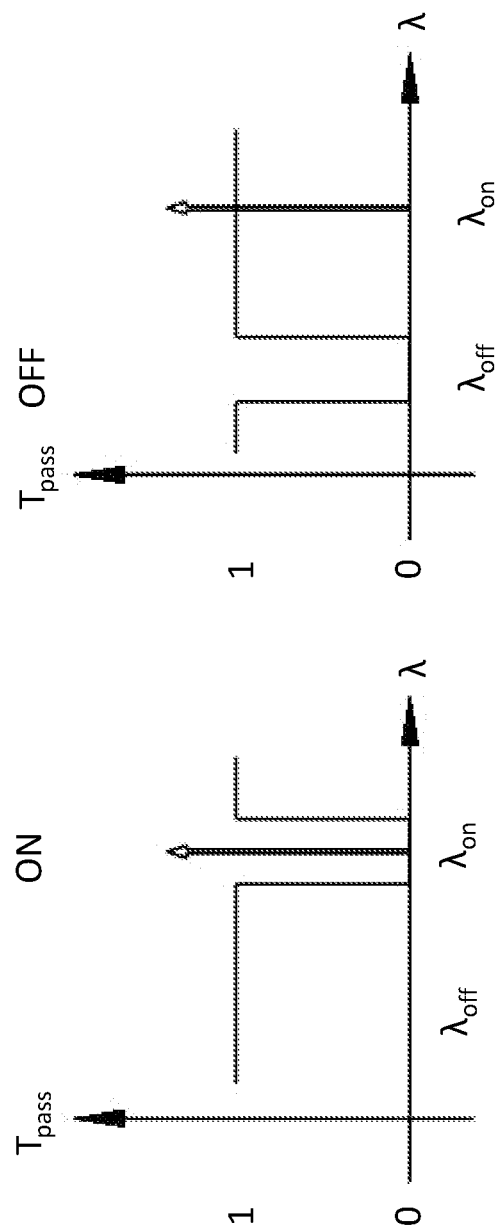

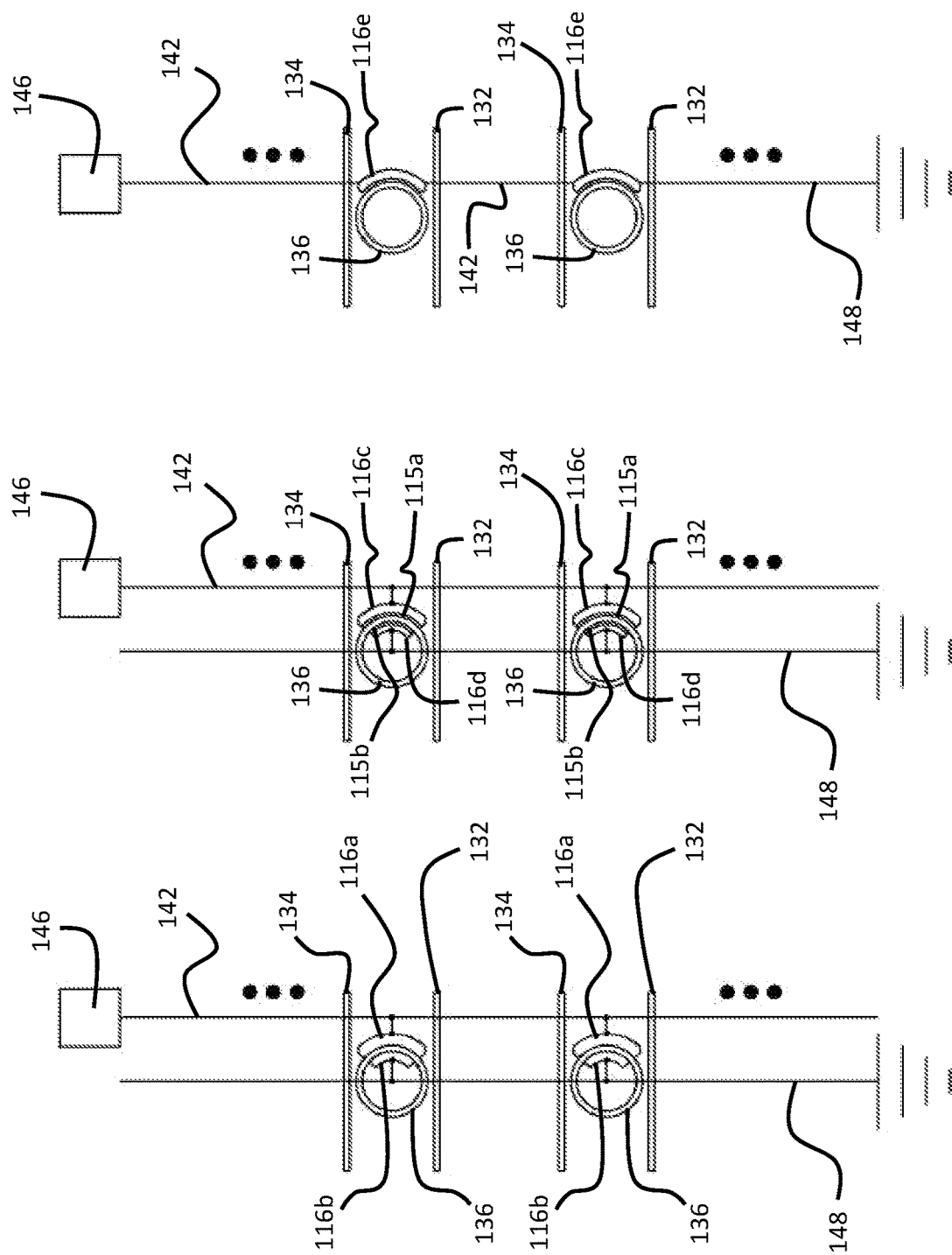

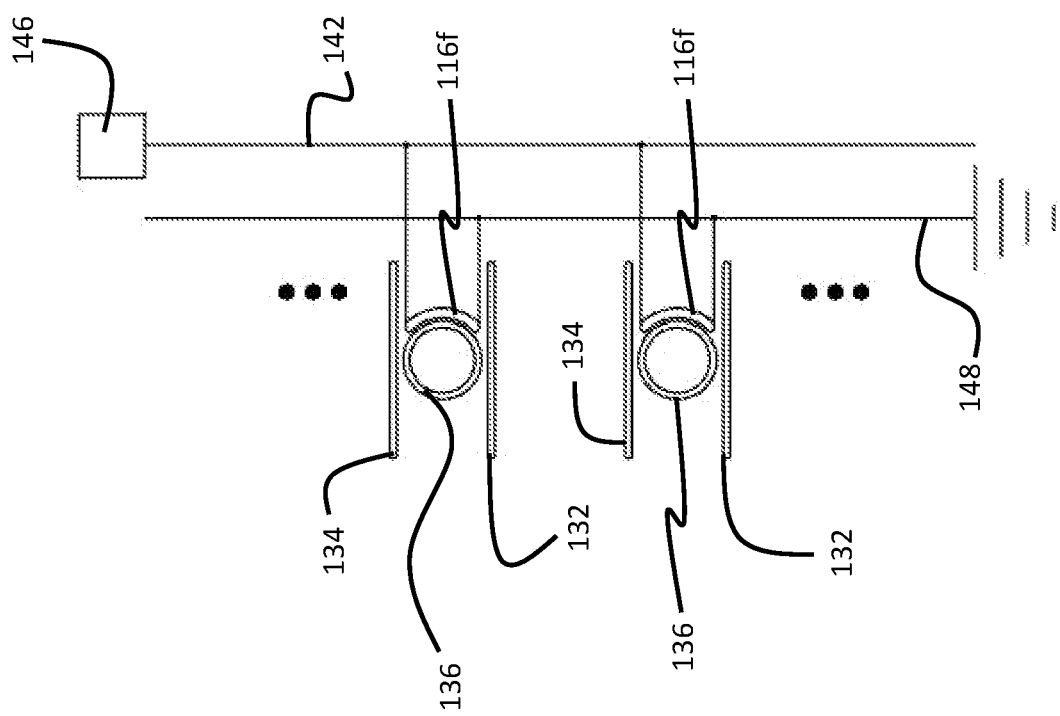

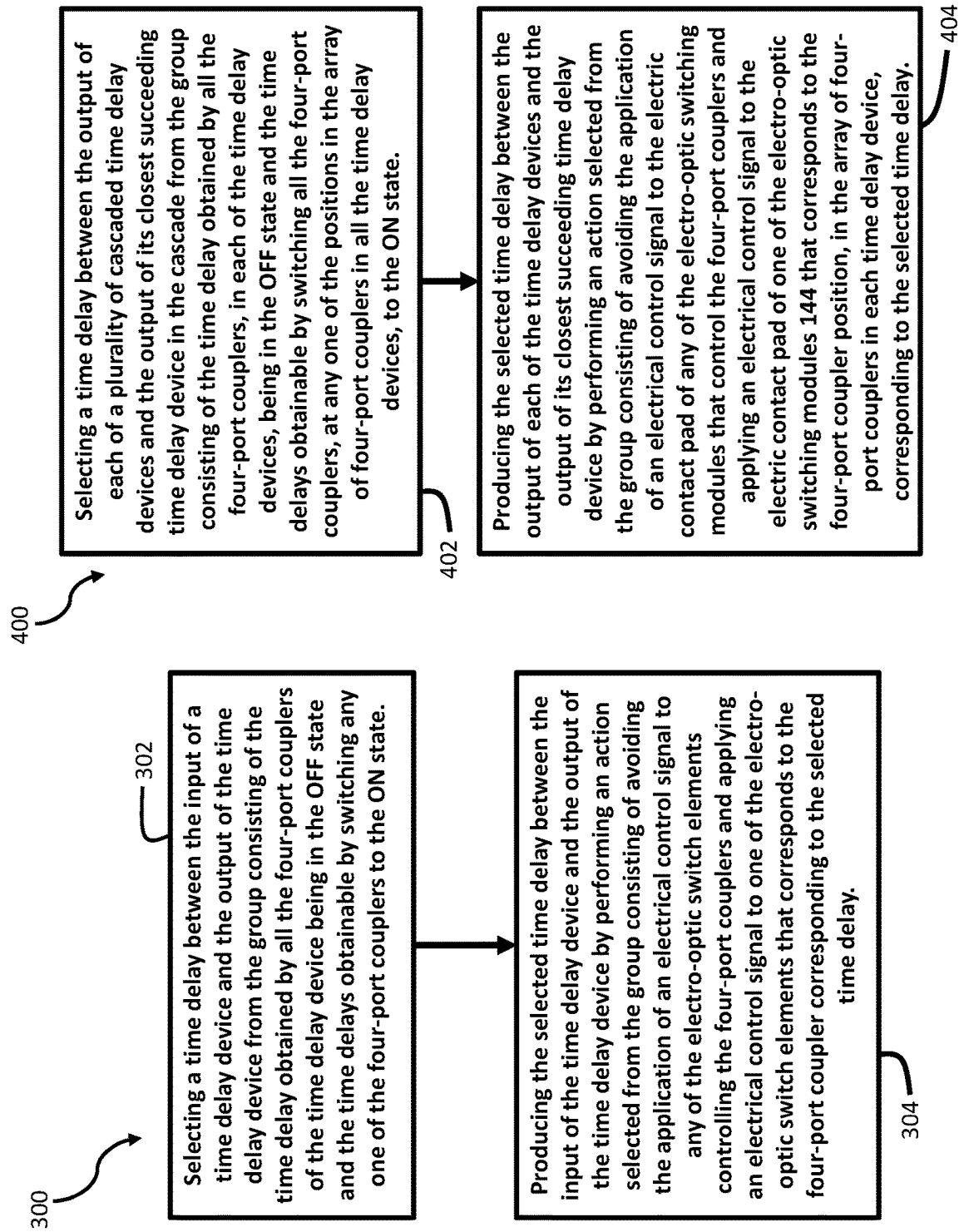

TRUE TIME DELAY CIRCUIT BASED ON AN OPTICAL WAVEGUIDE SWITCHING ARRAY FOR RF PHASED ARRAY ANTENNA BEAM STEERING

GOVERNMENT INTEREST

The embodiments herein may be manufactured, used, and/or licensed by or for the United States Government without the payment of royalties thereon.

BACKGROUND

Technical Field

The embodiments herein generally relate to apparatuses and methods for providing tunable delays in optical and RF signals and their applications.

Description of the Related Art

Steering of transmitted radio frequency (RF) beams using phased antenna arrays is increasingly vital to radar and telecommunication technologies. Arrays of time (i.e., phase) delayed RF inputs with a tunable time delay are used for this type of RF beam steering. Limitations of existing approaches for providing the array of RF signals include bulky (table-top size) and heavy systems, limited operation bandwidth, performance problems due to intensity and phase fluctuations causing side-lobe increases, and expense. There remains a need for improved systems for producing tunable phased arrays of RF signals that overcome the deficiencies of existing systems.

SUMMARY

Some embodiments herein utilize an array of electro-optic switches to introduce optical true time delay by selectively routing optical signals in integrated optical waveguides. Therefore, the operation bandwidth of the embodiments herein is very large compared to that of existing grating-based or resonance-based optical time delay line approaches.

Some embodiments herein are directed to a chip-scale tunable optical time-delay lines cascaded array using a 2-D electro-optic (EO) switching matrix for radio-frequency (RF) phased-array antenna beam forming and steering. Embodiments herein are designed to provide a cascaded semiconductor-waveguide-based EO switching architecture to create an electrically tunable time delay using photonic integrated circuit (PIC) components. The embodiments herein offer large operation bandwidth, frequency independent time delay, significant cost reduction from CMOS compatible system components for a number of commercial and military applications such as wideband RF phased array Radars, electronic warfare (EW) systems, satellite-based communications, self-driving/autonomous vehicles, remote sensing, compact antennas for next-generation wireless communications such as 5G systems, target ranging and identification, etc.

In some embodiments herein, an array of tunable optical time delay channels is generated by employing an electro-optically controlled optical signal routing scheme using U-shaped, optical waveguide loops to create broadband optical true time delay in the delay channels or outputs. Equally spaced optical micro-ring resonators are placed in the U-shaped, optical loop to control the signal routing path and thus the time delay produced in the signal. In this system, desired time delay is introduced to a guided optical beam in the U-shaped, waveguide loop by selective electrical activation of the switching modules controlling the refractive index of the optical micro-ring resonators and in turn the overall propagation distance of the optical signal in the system to determine the optical time delay.

Some embodiments herein are directed to carrying an RF signal in the optical domain using an optical waveguide time delay circuit to split the RF-signal into an arrayed n channels that has relative true time delays $\Delta t$, $2\Delta t$, $3\Delta t$, . . . , $n\Delta t$ between these output signals. The $\Delta t$ delay is tunable by the optical circuit so it will allow the collimated RF beam to be steered in space. This is a superior technology compared to existing RF-based phase steering approaches since it can provide wideband operation for the RF signals.

One aspect of some of the embodiments herein is provided by the micro-ring-based EO switching architecture, which allows the creation of precision tunable true time delays without intensity or phase fluctuation. This architecture also allows an EO true-time-delay system to be implemented on a chip-scale small size circuit that can be fabricated by standard Si based integrated circuit manufacturing processes, such as CMOS. Further advantages of some embodiments herein include low-cost and high system scalability. Some embodiments disclosed herein are highly scalable because the scanning resolution and the overall range can be easily adjusted by increasing the number of micro-rings and the separation between adjacent (i.e., closest neighboring) micro-rings in each U-shaped loop. This scalability is of great utility in designing a phased array antenna based beam steering system. The cascaded array architecture of some embodiments herein provides very large cascaded time delay with a very small foot-print. The embodiments herein offer a very wide operation bandwidth, since the induced time delay in the embodiments herein is based on the uniform optical dispersion in a Si-based waveguide, and mechanical noise immunity with no moving parts in the system.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 6A through 6D are graphs illustrating the normalized spectral responses of the drop port and the pass port of a micro-ring resonator that is capable of being used with some of the embodiments disclosed herein;

FIGS. 8A through 8D are schematic diagrams illustrating various embodiments of the electro-optic switch element for use with some of the embodiments disclosed herein;

FIG. 12 is a flow diagram illustrating a process for producing a tunable time-delayed signal in accordance with some of the embodiments disclosed herein; and FIG. 13 is a flow diagram illustrating a process for producing an array of relatively time-delayed signals in accordance with some of the embodiments disclosed herein.

DETAILED DESCRIPTION

Figure 1:
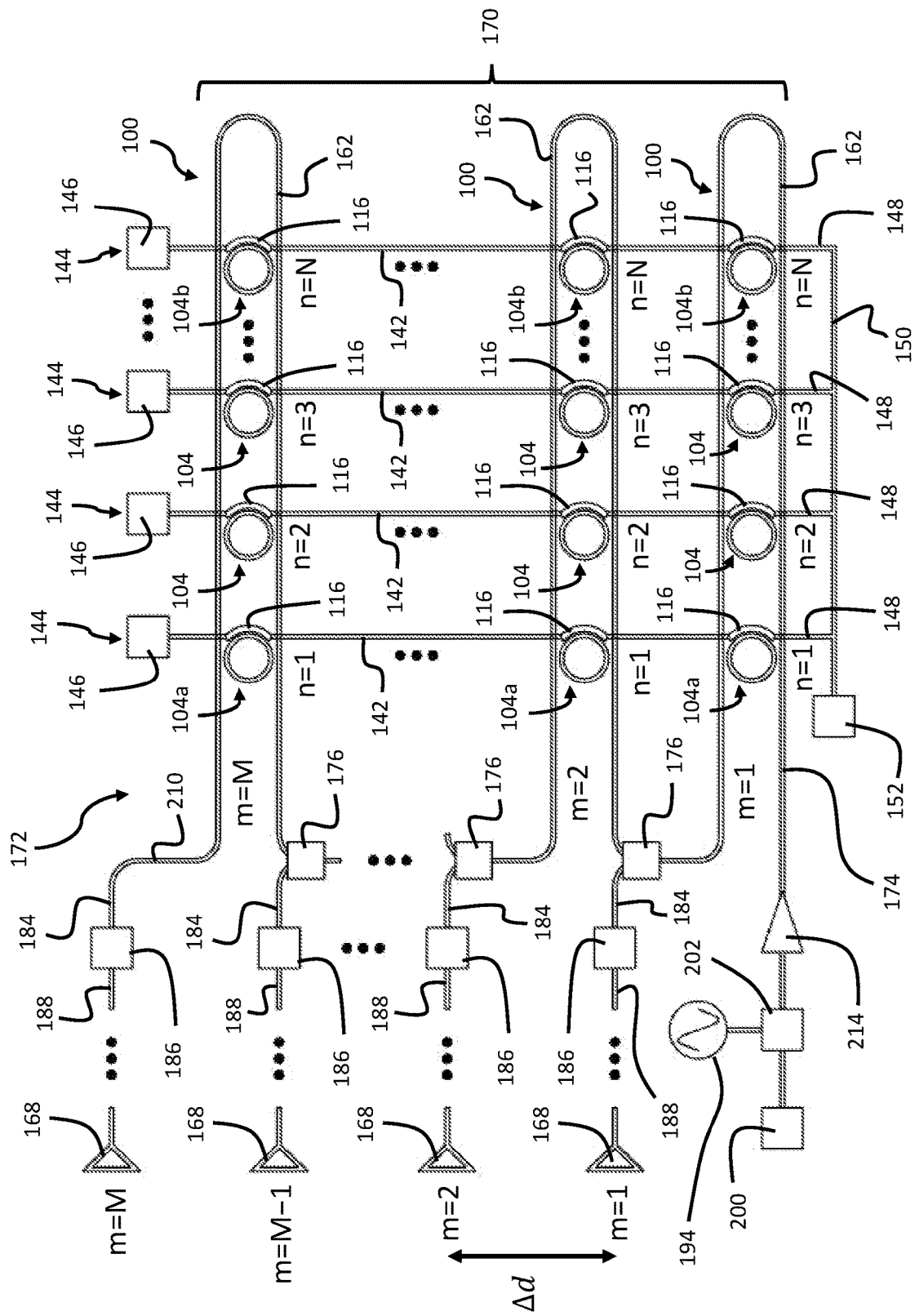
FIG. 1 is a schematic diagram illustrating a device for producing a one-dimensional array of relatively time-delayed signals in accordance with an example embodiment disclosed herein.
Figure 2:
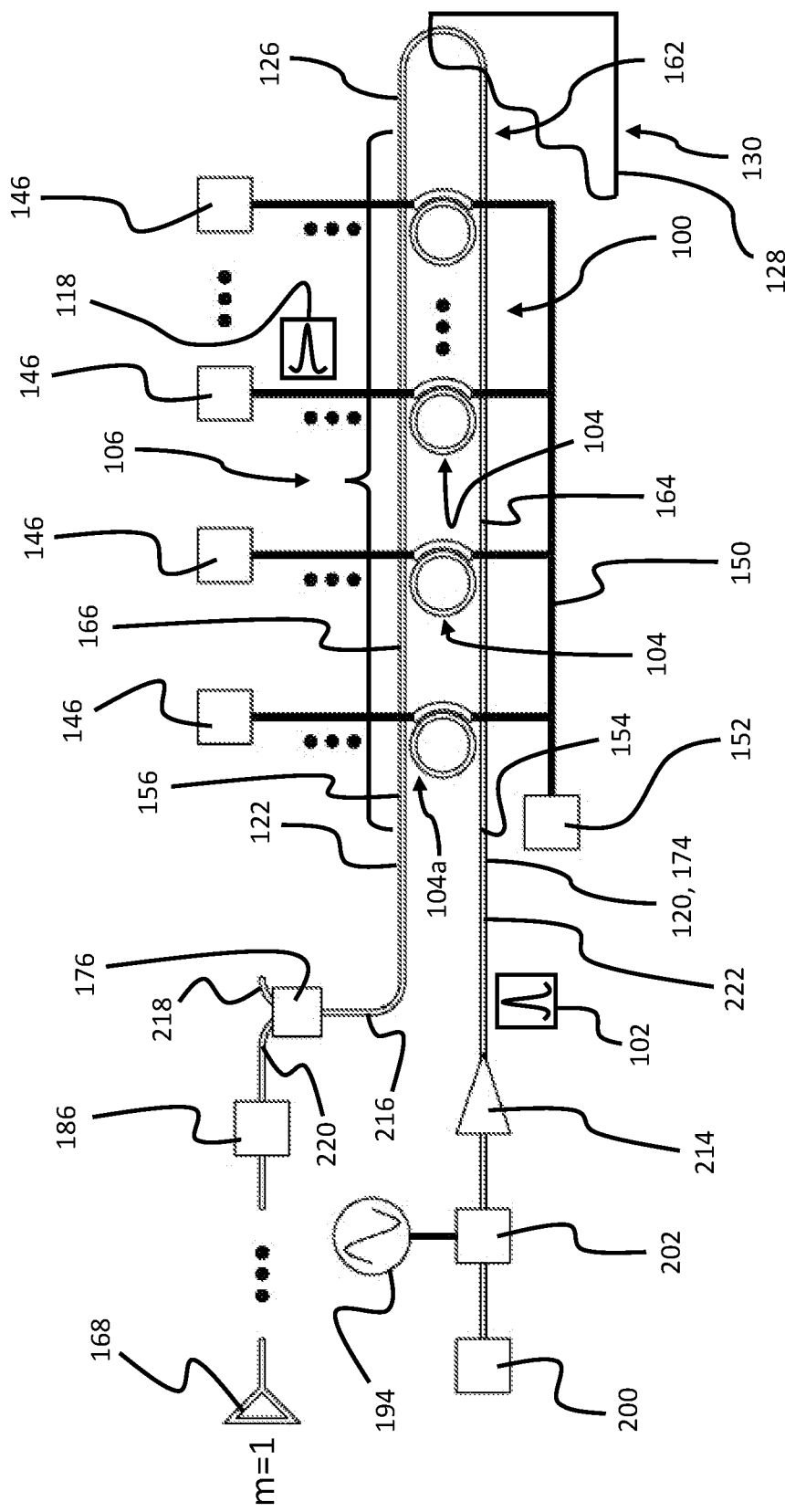
FIG. 2 is an enlarged fragment of the embodiment of FIG. 1 to more clearly show certain details.
Figure 3:
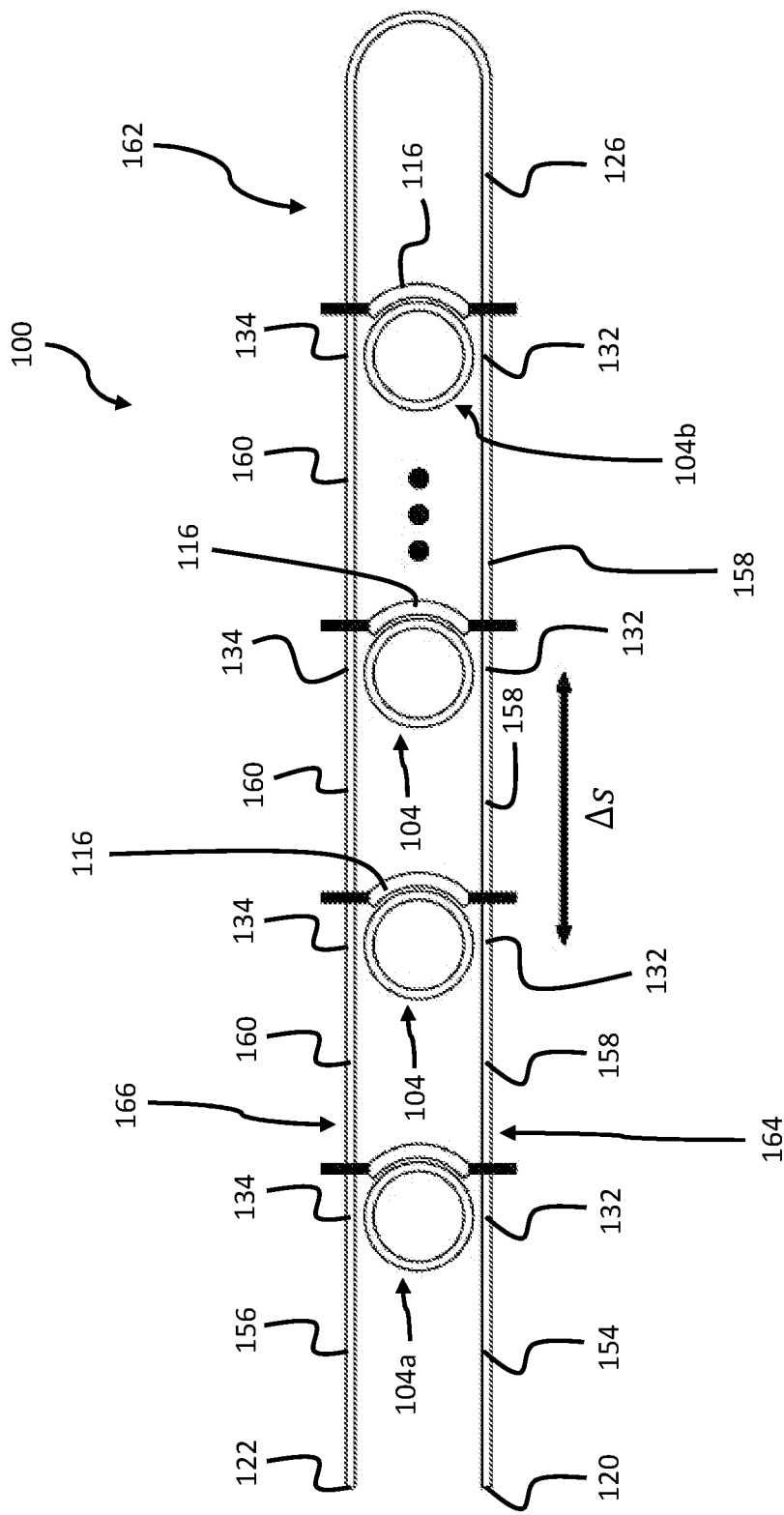
FIG. 3 is a schematic diagram illustrating a time delay device for use with some of the embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring to FIGS. 1 through 13, some embodiments herein are directed to a time delay device 100 for producing a time delay of a time delay increment in an optical signal 102. The time delay device includes a plurality of four-port switches 104, 104a, and 104b. The plurality of four-port switches 104, 104a, and 104b are arranged along a distance in an array 106. In the illustrated example, the array 106 is a linear array. Each four-port switch 104, 104a, and 104b of the plurality of four-port switches includes a first port 108, a second port 110, a third port 112, and a fourth port 114. In the array 106, there is at least a first four-port switch 104a and a last four-port switch 104b. Each of the plurality of four-port switches 104, 104a, and 104b has an OFF state and an ON state. At the OFF state, the first port 108 of each four-port switch 104, 104b in the array 106 is in optical communication with the second port 110 of the closest preceding four-port switch 104, 104a in the array 106 except for the first four-port switch 104a in the array, which is not preceded by a four-port switch in the array 106. The fourth port 114 of each four-port switch 104, 104b in the array 106 is in optical communication with the third port 112 of the closest preceding four-port switch 104, 104a in the array 106 except for the first four-port switch 104a in the array 106, which is not preceded by a four-port switch in the array 106. Each of the plurality of four-port switches is configured to place its first port 108 in optical communication with its fourth port 114 at least when it is in the ON state.

The time delay device 100 has an input 120 for receiving the optical signal 102 and an output 122 for the optical signal having a time delay to be communicated onward. The time delay device 100 also includes a plurality of electro-optic or heating elements 116. For each of the plurality of four-port switches 104, 104a, and 104b, there is at least one respective electro-optic or heating element 116 among the plurality of electro-optic or heating elements. Each of the plurality of electro-optic or heating elements 116 is configured to operably interact with a respective one of the plurality of four-port switches 104, 104a, and 104b at least when the electro-optic or heating element 116 is energized by applying an electrical control signal 118 to the electro-optic or heating element 116. The time delay increment between the optical signal at the input 120 of the time delay device 100 and the optical signal at the output 122 of the time delay device 100 is capable of being selectively varied at least by placing a selected one of the plurality of four-port switches 104, 104a, and 104b in the ON state while other remaining four-port switches of the plurality of four-port switches 104, 104a, and 104b are in the OFF state.

Each of the plurality of four-port switches 104, 104a, and 104b is adapted to be in the ON state when the electrical control signal is applied to its respective electro-optic or heating element 116. Each one of the plurality of four-port switches 104, 104a, and 104b is capable of conducting the optical signal from its first port 108 to its fourth port 114 when the four-port switch is in the ON state. Each one of the plurality of four-port switches 104, 104a, and 104b conducts the optical signal from its first port 108 to its fourth port 114 when the four-port switch is in the ON state during operation of the time delay device 100. When the optical signal in conducted from the first port 108 of a four-port switch to the fourth port 114 of the four-port switch, the optical signal is said to have crossed the four-port switch herein. Each one of the plurality of four-port switches 104, 104a, and 104b does not conduct the optical signal from its first port 108 to its fourth port 114 when the four-port switch 104, 104a, and 104b is in the OFF state. Accordingly, the optical signal cannot cross the four-port switch 104, 104a, and 104b from its first port 108 to its fourth port 114 when the four-port switch 104, 104a, and 104b is in the OFF state. Instead when the four-port switch is in the OFF state, the optical signal continues on from the first port 108 of the four-port switch to the second port 110 of the four-port switch and from the third port 112 to the fourth port 114 of the four-port switch, except for the last four-port switch 104b in the array, which does not have a succeeding four-port switch.

The time delay device 100 defines an optical excursion path 124 having an optical path length that is capable of being selectively varied at least by placing a selected one of the plurality of four-port switches 104, 104a, and 104b in the ON state while the other remaining four-port switches of the plurality of four-port switches in the array 106 are in the OFF state. Assuming there are N four-port switches 104, 104a, and 104b in the array 106, where N is an integer and N≥2, and assigning position 1 in the array 106 to the first four-port switch 104a, then the last four-port switch 104b occupies position N, while the other four-port switches 104 in the array 106 occupy positions 2 through N−1, respectively. The optical excursion path provided by the time delay device 100, and taken by the optical signal during operation of the time delay device 100, is shortest when the first four-port switch 104a is in the ON state and the other four-port switches in the array 106 are in the OFF state. Consequently, the time delay provided by the time delay device 100 is the shortest when the first four-port switch 104a is in the ON state and the other four-port switches in the array 106 are in the OFF state. As the position number in the array 106 of the lowest-position four-port switch that is in the ON state is increased, the optical excursion path taken by the optical signal, and consequently the time delay provided by the time delay device 100, becomes longer. The time delay provided by the time delay device 100 refers to the time delay increment between the optical signal at the input 120 of the time delay device 100 and the optical signal at the output 122 of the time delay device 100. Accordingly, the time delay increment between the optical signal at the input 120 of the time delay device 100 and the optical signal at the output 122 of the time delay device 100 is capable of being selectively varied at least by placing a selected one of the plurality of four-port switches 104, 104a, and 104b in the ON state while the other remaining four-port switches of the plurality of four-port switches in the array 106 are in the OFF state.

The time delay device 100 further includes a terminal waveguide 126 connecting the second port 110 and the third port 112 of the last four-port switch 104b in the array 106 such that the time delay device 100 has a base time delay increment between the optical signal at the input 120 of the time delay device and the optical signal at the output 122 of the time delay device that corresponds to all of the plurality of four-port switches 104, 104a, and 104b being in the OFF state. When all of the plurality of four-port switches 104, 104a, and 104b in the array 106 are in the OFF state, the optical excursion path 124 provided by the time delay device 100, and consequently the time delay provided by the time delay device 100, is the longest. In some embodiments herein, the time delay device 100 may be integrated on a common substrate 128 with other optical or electronic components and forms at least a portion of a chip-scale integrated photonic circuit 130. In some examples herein, at least the input 120, the output 122, the plurality of four-port switches 104, 104a, and 104b, and the plurality of electro-optic or heating elements 116 are integrated on a common substrate 128 to form at least a portion of a chip-scale integrated photonic circuit 130.

Each of the plurality of four-port switches 104, 104a, and 104b is a four-port micro-ring resonator. Each four-port switch 104, 104a, and 104b includes a first waveguide 132, a second waveguide 134, and a closed-loop resonator waveguide 136. The first waveguide 132 extends between the first port 108 of the four-port switch and the second port 110 of the four-port switch, and the second waveguide 134 extends between the third port 112 of the four-port switch and the fourth port 114 of the four-port switch. The first waveguide 132 and the second waveguide 134 extend approximately in parallel to each other. The closed-loop resonator waveguide 136 is positioned relative to the first waveguide 132 and the second waveguide 134 such that a first portion 138 on one side of the closed-loop resonator waveguide 136 is located in close proximity to the first waveguide 132, and a second portion 140 on the other or opposite side of the closed-loop resonator waveguide 136 is located in close proximity to the second waveguide 134. The first portion 138 and the second portion 140 of the closed-loop resonator waveguide 136 should be in sufficiently close proximity to the first waveguide 132 and the second waveguide 134, respectively, such that light from the first waveguide 132 is coupled into the closed-loop resonator waveguide 136 and light from the closed-loop resonator waveguide 136 is coupled into the second waveguide 134. Apart from micro-ring resonators, resonators employing electro-mechanical micro-mirror devices and optical 2×2 switches based on an optical fiber switch, though the latter may have too large a footprint for application to integrated photonic circuit chips, may be used to implement the function of the four-port switch in some embodiments herein.

Each of the plurality of four-port switches 104, 104a, and 104b is actuated to be in the ON state by the respective one of the electro-optic or heating elements 116, which causes a change to the refractive index of at least a portion, for example the closed-loop resonator waveguide 136, of the respective one of the plurality of four-port switches when the electrical control signal is applied to the respective one of the plurality of electro-optic or heating elements 116. When the electrical control signal is applied to a respective one of the plurality of electro-optic or heating elements 116, the index of refraction of the closed-loop resonator waveguide 136 of the corresponding four-port switch changes such that the resonant wavelength of the closed-loop resonator waveguide 136 matches the wavelength ($\lambda_{on}$) of the optical signal in the first waveguide 132. Under this condition, the optical signal is transferred from the in the first waveguide 132 to the second waveguide 134, and the corresponding four-port switch can be said to be in the ON state. Without the electrical control signal being applied to the corresponding electro-optic or heating element 116, the four-port switch reverts to the OFF state, in which the resonant wavelength of the closed-loop resonator waveguide 136 and the wavelength of the optical signal in the first waveguide 132 are mismatched. The optical signal cannot be transferred from the in the first waveguide 132 to the second waveguide 134 when the resonant wavelength of the closed-loop resonator waveguide 136 and the wavelength of the optical signal in the first waveguide 132 are mismatched.

Each of the electro-optic or heating elements 116 may be electrical, thermal, or a combination of both electrical and thermal elements. FIGS. 8A through 8D illustrate various embodiments of the switch elements 116. In some embodiments, the switch elements 116 may be made of electrodes 116a and 116b that contact the ring resonator 136 and change its index of refraction, and its resonant wavelength, through carrier injection. In some embodiments the switch elements 116 may include doped material. In some embodiments, the switch elements 116 may have a characteristic carrier density profile. In some embodiments, the switch elements 116 may comprise semiconductor material of different types (e.g. n-type or p-type). In one embodiment of an electrical switch element 116, the electrical conductor 142 carrying the electrical control signal and the ground conductor 148 make conductive contacts with respective electrodes 116c and 116d that may form part of gate-like structures where the electrodes are separated from the ring resonator 136 by thin insulating layers 115a and 115b, respectively. In this case, the electrical control signal may apply a bias voltage to the ring resonator 136 to change the resonant wavelength of the ring resonator 136 to the desired value. The thermal switching element is essentially and electric heating element 116e that raises the temperature of the ring resonator 136 to change the resonant wavelength of the ring resonator 136 to the desired value.

FIG. 8D also shows a thermal switching element 116f that raises the temperature of the ring resonator 136 to change the resonant wavelength of the ring resonator 136 to the desired value. The only significant difference between the embodiments of FIGS. 8C and 8D is that the switching elements 116f are wired in parallel between the corresponding electric contact pad 146 and the corresponding ground connection 148, while the switching elements 116e are wired in series between the corresponding electric contact pad 146 and the corresponding ground connection 148.

Some embodiments herein comprise a plurality of electro-optic switching modules 144. Each of the plurality of electro-optic switching modules 144 includes a respective one of the plurality of electro-optic or heating elements 116 and the corresponding electrical conductor 142. Each of the plurality of electro-optic switching modules 144 further includes an electric contact pad 146 and a ground connection 148. Some embodiments include a ground conductor 150 that connects the ground connection 148 of each of the plurality of electro-optic switching modules 144 to a common ground contact pad 152 for connection to an electrical ground during operation of the time delay device.

In the illustrated embodiment, the first port 108 of the first four-port switch 104a is connected by a length of waveguide 154 to the input 120 of the time delay device 100. In some embodiments, the first port 108 of the first four-port switch 104a may serve as the input 120 of the time delay device 100. In the illustrated embodiment, the fourth port 114 of the first four-port switch 104a is connected by a length of waveguide 156 to the output 122 of the time delay device 100. In some embodiments, the fourth port 114 of the first four-port switch 104a may serve as the output 122 of the time delay device 100.

In some embodiments, the second port 110 of each four-port switch in the array 106 is optically connected to the first port 108 of the closest succeeding four-port switch in the array 106 by a length of optical waveguide 158, except for the last four-port switch 104b in the array 106. The second port 110 and the third port 112 of the last four-port switch 104b in the array 106 are connected to respective ends of the terminal waveguide 126. In some embodiments, the third port 112 of each four-port switch in the array 106 is optically connected to the fourth port 114 of the closest succeeding four-port switch in the array 106 by a length of optical waveguide 160, except for the last four-port switch 104b in the array 106. In some embodiments, the second port 110 of each four-port switch in the array 106 is directly connected to the first port 108 of the closest succeeding four-port switch in the array 106, except for the last four-port switch 104b in the array 106. In some embodiments, the third port 112 of each four-port switch in the array 106 is directly connected to the fourth port 114 of the closest succeeding four-port switch in the array 106, except for the last four-port switch 104b in the array 106.

In some embodiments, the optical path extending from the input 120, through the connecting waveguide 154 if present, through the first waveguides 132 of the plurality of four-port switches, through the connecting waveguides 158 if present, through the terminal waveguide 126, through the second waveguides 134, through the connecting waveguides 160 if present, through the connecting waveguide 156 if present, and to the output 122 to form a U-shaped waveguide loop 162. The U-shaped waveguide loop 162 includes an input optical pathway 164 that is formed by the connecting waveguide 154 if present, the first waveguides 132 of the plurality of four-port switches, and the connecting waveguides 158 if present. The U-shaped waveguide loop 162 also includes an output optical pathway 166 that is formed by the second waveguides 134, the connecting waveguides 160 if present, and the connecting waveguide 156 if present. The output optical pathway 166 is spaced apart from the input optical pathway 164. The input optical pathway 164 has a first end that coincides with the input 120 of the time delay device 100 and a second end that coincides with the second port 110 of the last four-port switch 104b. The output optical pathway 166 has a first end that coincides with the output 122 of the time delay device 100 and a second end that coincides with the third port 112 of the last four-port switch 104b. The input optical pathway 164 and the output optical pathway 166 extend in spaced apart relationship over a distance. The first end of the input optical pathway 164 acts as the input to the U-shaped waveguide loop 162 and the first end of the output optical pathway 166 acts as the output of the U-shaped waveguide loop 162.

The plurality of four-port switches 104, 104a, and 104b are distributed along the distance over which the input optical pathway 164 and the output optical pathway 166 extend in spaced apart relationship. Accordingly, the closed-loop resonator waveguides 136 of the four-port switches 104, 104a, and 104b are distributed along the distance over which the input optical pathway 164 and the output optical pathway 166 extend in spaced apart relationship. Each of the closed-loop resonator waveguides 136 of the four-port switches 104, 104a, and 104b at least in part spans the distance between the input optical pathway 164 and the output optical pathway 166. The second end of the input optical pathway 164 and the second end of the output optical pathway 166 are connected to respective ends of the terminal waveguide 126.

In some embodiments herein, a plurality of the time delay devices 100 can be used for steering the beam emanating from a one dimensional array of antennas 168. In the illustrative example, there are N four-port switches 104, 104a, and 104b in each time delay device 100, where N is an integer and N≥2. It is possible for N=1, which would mean that the time delay device would provide only two time delay increments; however, having a greater number of four-port switches in each time delay device 100 would make more efficient use of the available chip space.

The plurality of time delay devices 100 includes a first time delay device and a last time delay device. The plurality of time delay devices 100 are connected in series with the output 122 of each of the plurality of time delay devices, except for the last time delay device, being connected to the input 120 of the closest succeeding one of the plurality of time delay devices 100 to form a cascade 170 in an electro-optic cascade device 172.

In the illustrative example, the number of the plurality of four-port switches is the same in each of the plurality of time delay devices 100. The four-port switch 104a closest to the input 120 of each time delay device 100 is at position 1 in a corresponding array 106 of four-port switches and corresponds to the first four-port switch 104a in the corresponding array 106 of four-port switches. The four-port switch 104b at position N in the corresponding array 106 of four-port switches corresponds to the last four-port switch in the corresponding array 106 of four-port switches. The plurality of four-port switches 104, 104a, and 104b in each of the plurality of time delay devices occupy positions 1 through N in the corresponding array 106 of four-port switches, respectively.

In the illustrative example, the electro-optic cascade device 172 further comprises a plurality of electro-optic switching modules 144. There is a respective electro-optic or heating element 116 for each four-port switch 104, 104a, and 104b in each of the plurality of time delay devices 100. Each of the plurality of electro-optic or heating elements 116 is positioned and configured for operably interacting with a respective four-port switch from among the plurality of four-port switches 104, 104a, and 104b of the plurality of time delay devices 100 to selectively switch the respective four-port switch 104, 104a, or 104b to the ON state.

There are N electro-optic switching modules 144 in the electro-optic cascade device 172. There is a respective electro-optic switching module 144 for each of the positions 1 through N of the arrays 106 of four-port switches in the plurality of time delay devices 100. Each of the N electro-optic switching modules comprises the electro-optic or heating elements 116 for the four-port switches at the corresponding position of the array 106 of four-port switches in the plurality of time delay devices 100. Each of the plurality of electro-optic switching modules 144 further comprises an electric contact pad 146 and a ground connection 148. All the electro-optic or heating elements 116 for each position in the array 106 of four-port switches in all the plurality of time delay devices 100 are part of a respective electro-optic switching module 144. The electro-optic or heating elements 116 in the respective electro-optic module 144 are connected in series or in parallel between the corresponding electric contact pad 146 and the corresponding ground connection 148 of the respective electro-optic switching module 144 such that the four-port switches at a selected position in the array 106 of four-port switches in all the plurality of time delay devices 100 are capable of being switched to the ON state at about the same time by placing an electrical control signal on the electric contact pad 146 of the respective electro-optic switching module 144.

The electro-optic cascade device 172 also includes a ground conductor 150 connecting the ground connection 148 of each of the plurality of electro-optic switching modules 144 to a common ground contact pad 152 for connection to an electrical ground during operation of the electro-optic cascade device 172.

In the illustrative example, there are M time delay devices 100 in the plurality of time delay devices in the electro-optic cascade device 172, where M is a positive integer and M≥2. There is a first time delay device 100 in the cascade occupying position 1 in the cascade when each of the plurality of time delay devices 100 is identified for reference by a respective integer m indicative of the position of each of the plurality of time delay devices in the cascade 170, where 1≤m≤M. The input 120 of the first time delay device 100 serves as the input 174 to the electro-optic cascade device 172.

In the illustrative example, the electro-optic cascade device 172 further includes at least M−1 optical signal splitters 176. An optical signal splitter 176 is provided in optical communication with the output 122 of each time delay device 100 at positions 1 through M−1 in the cascade 170. Each of the optical signal splitters 176 has an input 178 that is connected to the output 122 of a respective time delay device 100. Each of the optical signal splitters 176 has a first output 180 that is connected to the input 120 of a time delay device 100 that is next in order following the corresponding time delay device 100 of each optical signal splitter 176. Each of the optical signal splitters 176 has a second output 182 that allows access to the optical signal at the output 122 of the respective time delay device 100 for further application. An optical signal splitter 176 is not required for the output 122 of the last time delay device 100 in the cascade 170 because there is no time delay device following the last time delay device 100 in the cascade 170. Accordingly, the output 122 of the last time delay device in the cascade 170 is directly accessible for further application.

The cascade 170 is capable of providing an array of M optical signals from M outputs 184 with the help of the M−1 optical signal splitters 176. Each optical signal in the array of M optical signals, at the M outputs 184, has a time delay of a time delay increment $\Delta t$ relative to an optical signal immediately previous in order in the array of M optical signals, where $\Delta t$ is tunable at least through the use of the plurality of electro-optic switching modules 144. Each optical signal in the array of M optical signals has a time delay of $m\Delta t$ relative to the optical signal at the input 120 of the first time delay device 100 in the cascade 170. Each optical signal in the array of M optical signals has a respective time delay device 100, and m is the positive integer indicative of the position, in terms of order, of the respective time delay device 100 in the cascade 170. The time delay increment $\Delta t$ is capable of having a value selected from the group consisting of the base time delay increment of any of the plurality of time delay devices 100 and the time delay increments, between the input and output of any one of the time delay devices in the cascade 170, obtainable by switching any one of the four-port switches 104, 104a, and 104b in any of the time delay devices 100 to the ON state.

In the illustrated embodiment, the electro-optic cascade device 172 further comprises an array of M photodetectors 186 arranged with each photodetector 186 occupying a respective one of position 1 through position M in the array of M photodetectors. Each photodetector 186 has an output 188 and an input 190. Each photodetector 186 produces an RF signal at its output 188 responsive to an optical signal received at its input 190. Accordingly, the outputs 188 of the M photodetectors 186 constitute an array of M RF signal outputs 188. Each of the photodetectors 186 occupying a respective one of position 1 through position M−1 in the array of M photodetectors communicates with the second output 182 of a respective one of the M−1 optical signal splitters 176. The photodetector 186 occupying position M in the array of M photodetectors communicates with the output of the last time delay device 100 in the cascade 170 of time delay devices such that the array of M photodetectors 186 produces an array of M RF signals. The photodetector 186 in each of position 1 through position M in the array of M photodetectors corresponds to the time delay device 100 in the same position in terms of order in the cascade 170 of time delay devices. Each RF signal, from the output 188 of a respective photodetector 186, occupies a respective one of position 1 through position M in the array of M RF signals. Each RF signal in the array of M RF signals has a time delay relative to an RF signal immediately previous in order in the array of M RF signals that is settable by setting the time delay between the respective optical signals from the array of M optical signals reaching the inputs of the respective photodetectors 186.

In some embodiments herein, a plurality of the electro-optic cascade devices 172 are used for steering the beam emanating from a two-dimensional array of antennas 168. Accordingly, some embodiments herein are directed to an electro-optic two-dimensional time delay array device 192 that includes a plurality of the M-output electro-optic cascade devices 172. The plurality of the M-output electro-optic cascade devices 172 are P in number, where M is a positive integer, M≥2, P is a positive integer, and P≥2, for providing a (P×M) array of time-delayed optical signals from a (P×M) array of time-delayed optical signal outputs. Each time-delayed optical signal output in the (P×M) array of time-delayed optical signal outputs has a position in the logical ordering of the (P×M) array of time-delayed optical signal outputs given by the ordered pair (p, m), where m and p are positive integers, 1≤m≤M, and 1≤p≤P. Each of the time delay devices 100 in each of the plurality of M-output electro-optic cascade devices comprises N four-port switches, where N is a positive integer and N≥2.

The electro-optic two-dimensional time delay array device 192 further comprises a P-output electro-optic cascade device 172*a*. The P-output electro-optic cascade device 172*a* has P outputs that form a (1×P) array of optical signals. The P-output electro-optic cascade device 172*a* differs from the electro-optic cascade device 172 at least in that the P-output electro-optic cascade device 172*a* does not include the photodetectors 186 as its optical outputs supply the optical inputs to the plurality of the electro-optic cascade devices 172. The P-output electro-optic cascade device 172*a* comprises P time delay devices 100*a* in the cascade 170*a* thereof. Each of the time delay devices 100*a* in the P-output electro-optic cascade device 172*a* comprises a U-shaped waveguide loop 162*a* and Q four-port switches 104, 104*a*, and 104*b*, where Q is a positive integer and Q≥2. The only difference between the time delay devices 100 and 100*a* is that in some embodiments they may contain different numbers of four-port switches 104, 104*a*, and 104*b*. Each of the P outputs of the P-output electro-optic cascade device 172*a* has a corresponding time delay device 100*a* in the cascade 170*a* of the P-output electro-optic cascade device 172*a*.

Each of the time delay devices 100*a* in the P-output electro-optic cascade device 172*a* has an input 120*a* and an output 122*a*. Each of the P outputs 184*a* of the P-output electro-optic cascade device 172*a* is formed by the second output 182 of an optical signal splitter 176, if the output of the corresponding time delay device is connected to an optical signal splitter 176; otherwise, the output 184*a* of the P-output electro-optic cascade device 172*a* is formed directly by the output 122*a* of the corresponding time delay device 100*a*. In the illustrated embodiment, the outputs 184*a* corresponding to position 1 through position P−1 in the array of output signals of the P-output electro-optic cascade device 172*a* are formed by the second output 182 of a corresponding optical signal splitter 176, while the output 184*a* corresponding to position P in the array of output signals of the P-output electro-optic cascade device 172*a* is formed by the output 122*a* of the corresponding time delay device 100*a*.

Each of the P outputs 184*a* of the P-output electro-optic cascade device 172*a* is connected to the input 174 of a respective one of the M-output electro-optic cascade devices 172. The input of each one of the M-output electro-optic cascade devices 172 is formed by the input 120 of the first time delay device 100 in the cascade of each one of the M-output electro-optic cascade devices 172. Each of the M-output electro-optic cascade devices 172 comprises M time delay devices 100 each of which has an output 122 such that each of the M-output electro-optic cascade devices 172 has M outputs 184.

The numerical index p also gives the position in the cascade 170*a* of the P-output electro-optic cascade device 172*a* of a respective time delay device 100*a*, the output of which is connected, either directly or through a corresponding beam splitter 176, to the input 174 of a respective one of the M-output electro-optic cascade devices 172. The M outputs 184, of the M-output electro-optic cascade device 172 that has its input 174 connected to the output 184*a* corresponding to the time delay device 100*a* at position p of the cascade of the P-output electro-optic cascade device 172*a*, provide the outputs 184 at logical positions (p, 1) through (p, M) in the (P×M) array of time-delayed optical signal outputs.

The electro-optic two-dimensional time delay array device 192 also includes a plurality of electro-optic switching modules 144*a* that are Q in number. Each electro-optic switching module 144*a* includes a pad 146, conductors 142, 148, and an electro-optic or heating element 116. A conductor 150 connects the electro-optic switching modules 144*a* to a common ground connection or contact pad 152. The statements made herein regarding the electro-optic switching modules 144 are also applicable to the electro-optic switching modules 144*a*, except that there may be a different number of the electro-optic switching modules 144*a* as compared to the electro-optic switching modules 144 in embodiments where Q is different from N.

The electro-optic two-dimensional time delay array device 192 also includes at least one laser 200, and at least one optical modulator 202. The optical modulator 202 has an optical input 204, an optical output 206, and an RF signal input 208 for providing a modulating RF signal, from a RF signal source 194 for example, to modulate the optical output of the optical modulator 202. The laser 200 produces an optical laser output that is directed to the optical input of the modulator 202. An RF signal is supplied to the RF signal input of the modulator 202 to produce a modulated optical signal at the optical output of the modulator 202. The optical output of the modulator 202 is connected directly or indirectly, for example via the amplifier 214, to the input 174*a* of the P-output electro-optic cascade device 172*a* to supply the P-output electro-optic cascade device 172*a* with a modulated optical signal.

The electro-optic two-dimensional time delay array device 192 also includes an (P×M) array of photodetectors 186 that are provided by the M photodetectors 186 of the P M-output electro-optic cascade devices 172. Each photodetector 186 in the (P×M) array of photodetectors has a position in the logical ordering of the (P×M) array of photodetectors given by the ordered pair (p, m), where m and p are positive integers, 1≤m≤M, and 1≤p≤P. Each photodetector 186 in the (P×M) array of photodetectors has an optical input 190 and a RF output 188. Each photodetector 186 in the (P×M) array of photodetectors receives a respective time-delayed optical signal from the (P×M) array of time-delayed optical signal outputs such that the (P×M) array of photodetectors is configured to output an (P×M) array of time-delayed RF signals. Each time-delayed RF signal in the (P×M) array of time-delayed RF signals has a position in the logical ordering of the (P×M) array of time-delayed RF signals given by the ordered pair (p, m). The time delay between a time-delayed RF signal at position (p, m) and its neighboring time-delayed RF signals within the range of positions (p±1, m±1) can be set by setting the time delay between the respective time-delayed optical signals from the (P×M) array of time-delayed optical signal outputs 184. The electro-optic two-dimensional time delay array device 192 may form at least a portion of a chip-scale integrated photonic circuit 212. Some of the accompanying illustrations appear to show the antennas 168, the laser 200, and the RF signal source 194 on the same photonic circuit 212 or 130; however, this does not need to be the case, and these and many other components in the illustrations may be located apart from or off of the photonic circuit. Some of the embodiments disclosed herein do not require any integration of the devices 172 or 192 in a photonic circuit.

Referring to FIG. 12, with reference to FIGS. 1 through 11, some embodiments herein involve a method (300) of producing a time delay in an optical signal using the time delay device 100. The method (300) includes selecting (302) a time delay between the input 120 of the time delay device 100 and the output 122 of the time delay device 100 from the group consisting of the time delay obtained by all the four-port switches 104, 104a, and 104b being in the OFF state and the time delays obtainable by switching any one of the four-port switches to the ON state. The method (300) also includes producing (304) the selected time delay between the input 120 of the time delay device 100 and the output 122 of the time delay device 100 by performing an action selected from the group consisting of preventing or otherwise avoiding the application of an electrical control signal to any of the electro-optic or heating elements 116 and applying an electrical control signal to one of the electro-optic or heating elements 116 that corresponds to the four-port switch 104, 104a, and 104b corresponding to the selected time delay.

Referring to FIG. 13, with reference to FIGS. 1 through 12, some embodiments herein involve a method (400) of producing an array of M time delayed signals using an electro-optic cascade device 172. The method (400) includes selecting (402) a time delay between the output 122 of each of the time delay devices 100 and the output 122 of its closest succeeding time delay device 100 from the group consisting of the time delay obtained by all the four-port switches, in each of the time delay devices 100, being in the OFF state and the time delays obtainable by switching all the four-port switches, at any one of the positions in the array of four-port switches in all the time delay devices 100, to the ON state. The method (400) also includes producing (404) the selected time delay between the output 122 of each of the time delay devices 100 and the output 122 of its closest succeeding time delay device 100 by performing an action selected from the group consisting of preventing or otherwise avoiding the application of an electrical control signal to the electric contact pad of any of the electro-optic switching modules 144 and applying an electrical control signal to the electric contact pad of one of the electro-optic switching modules 144 that corresponds to the four-port switch position, in the array of four-port switches, corresponding to the selected time delay.

One-Dimensional RF Beam Steering

Some embodiments herein provide tunable optical true time-delay output signal arrays for a RF phased array antenna. Such embodiments include a laser 200; an optical modulator 202; an optical amplifier 214; U-shaped waveguide loops 162 integrated with four-port micro-ring resonators 104, 104a, and 104; waveguides 216, 218, 220, and 210; optical splitters 176; and photodetectors 186. An optical signal is generated, modulated, and amplified by a laser 200, a signal modulator 202, and an amplifier 214, respectively. The modulated optical signal is guided by transmission lines 162, 216, 218, 220, and 210 and selectively routed by by-pass optical switches, formed by the four-port micro-ring resonators 104, 104a, and 104 and the switch elements 116, in the time delay systems according to the embodiments herein such as the electro-optic cascade device 172 and the electro-optic two-dimensional time delay array device 192. Multiple time-delay optical output signals (i.e., the signals at the outputs 184) are created by the transmission lines 162, 216, 218, 220, and 210; by-pass switches formed by the four-port micro-ring resonators 104, 104a, and 104 and the switch elements 116; and the optical splitters 176. The time-delayed signals at outputs 184 are converted into electrical signals by photodetectors 186.

One example of the embodiments disclosed herein is illustrated in FIGS. 1 through 8C. This embodiment is an electro-optic cascade device 172 and includes an array of four-port switches, such as micro-ring resonators 104, 104a, 104b; silicon optical waveguides 162, 216, 218, 220, 222, and 210; photodetectors 186; electro-optic or heating elements 116; silicon-based 1-by-2 optical splitters 176; and an array of RF antennas 168. The overall schematic diagram of the 1-D time delay system, i.e., the electro-optic cascade device 172, is presented in FIG. 1. The electro-optic or heating elements 116 are integrated with the micro-ring resonators 104, 104a, 104b and are connected to metal wires 142. These elements 116 are externally controlled by an applied electric current via the electric pads 146. The working principle of this device is as follows. An optical input carrying RF signals, created by a laser 200, a modulator 202, and an optical amplifier 214, enters the waveguide 222. The micro-ring resonators 104, 104a, 104b are integrated into the U-shaped waveguide loops 162. The input signal travels through at least a portion of each of the U-shaped waveguide loops 162 depending on the positions of the micro-ring resonators 104, 104a, 104b that have been activated to the ON position or on none having been activated. As shown in the FIG. 1, there are M U-shaped waveguide loops 162. Each U-shaped waveguide loop 162 contains N equally-spaced micro-ring resonators 104, 104a, 104b integrated with the electro-optic switching modules 144. Accordingly, the electro-optic cascade device 172 includes an (M×N) array of micro-ring resonators 104, 104a, 104b with each "row" of N micro-ring resonators 104, 104a, 104b being integrated into a respective one of the U-shaped waveguide loops 162.

"Row" and "column" are used herein as a convenient way to reference the logical organization of the various arrays, both one and two dimensional, described herein and should be construed to imply the physical positioning or orientations of the members of the array unless otherwise specified.

The electro-optic cascade device 172 is a 1-D beam steering system that uses an array of tunable optical delay lines or time delay devices 100. Each of the time delay devices 100 includes one of the U-shaped waveguide loops 162, the corresponding micro-ring resonators 104, 104a, 104b, and the corresponding switch elements 116. The electro-optic cascade device 172 also includes waveguide-coupled photodetectors 186, the electric pads 146 for electro-optic switching modules 144, the metal wires 142, 148, and 150, and the electric pads 152 for ground contact.

The separation between adjacent micro-ring resonators 104, 104a, 104b is labelled as $\Delta s$. The switching modules 144 are connected via metal wires 142 to an array of contact pads 146, creating N columns of M switch elements 116, each column of switch elements 116 corresponding to a respective position index n in the rows or 1-D arrays of micro-ring resonators 104, 104a, 104b in the time delay devices 100, where $1 \leq n \leq N$. The optical switching operation at each micro-ring resonator 104, 104a, 104b can be achieved by two well-established mechanisms, one being based on thermo-optic effects and the other being based on free-carrier-based electro-refraction effects, such as the Franz-Keldysh effect. The electro-optic switching mechanism employed for the switch elements 116 is determined by the speed requirements of the beam steering application. Each of the individual U-shaped waveguide loops 162 are connected to the closest succeeding U-shaped waveguide loop 162 via a 1-by-2 unbalanced optical signal splitter 176 except for the last time delay device 100 at position m=M, which does not have a succeeding time delay device 100. The splitting ratios of beam splitters 176 in the array splitters 176 can be uniform or non-uniform depending on the requirements of the intended application. In the illustrated configuration, there are M optical output signals provided by the M optical outputs 184. The time delay of the output signals from the first splitter 176 to the last splitter 176, relative to the input signal to the first time delay device 100, is linearly increased with a fixed step size $\Delta t$, i.e., $\Delta t$, $2\Delta t$, $3\Delta t$, ..., and $(M-1)\Delta t$, corresponding to the outputs of the first $M-1$ time delay devices 100. The time delay between the output signal from the last time delay device and the input signal to the first time delay device 100 is $M\Delta t$. By applying an electric current signal to an electric contact pad 146 at a higher position in the array of contact pads 146, i.e., closer in position order to the N-th electric contact pad 146, additional time delay is added to the fixed step size $\Delta t$ in the time delay. The step size or time delay increment $\Delta t$ is at its maximum when all the micro-ring resonators 104, 104$a$, 104$b$ in a time delay device 100 are in the OFF state.

The time-delayed optical output from each U-shaped waveguide loop 162 is converted to an RF signal by an integrated photodetector 186. The converted RF signal is radiated into free space by the array of antennas 168. The propagation angle $\theta_z$ of the total radiated electromagnetic beam from the array of antennas 168 antenna array by activating the z-th column of electro-optic or heating elements 116 of the z-th electro-optic switching module 144 is determined by the following equation, which uses the initial optical path length difference ($\Delta L$) between the optical signals converted at adjacent photodetectors 186 corresponding to the first micro-ring resonator 104$a$ in the time delay devices 100 being in the ON state:

$$\theta_z = \sin^{-1}\left(\frac{n_g \cdot (\Delta L + 2 \cdot (z-1) \cdot \Delta s) \cdot \lambda_{RF}}{\lambda_{opt} \cdot \Delta d}\right)$$

where $n_g$ is the group refractive index of the guided optical wave, $\lambda_{opt}$ is the center wavelength of the optical wave in free space, $\lambda_{RF}$ is the center wavelength of the radiated RF wave into free space, and $\Delta d$ is the physical separation between the adjacent RF antennas in the array. The index z ranges from 1 to N and is merely a renaming of the array or column position index n to avoid confusion with the refractive index $n_g$.

The propagation angle $\theta_0$ of the total radiated electromagnetic beam from the array of antennas 168 antenna array when all the micro-ring resonators are in the OFF state is determined by the following equation:

$$\theta_0 = \sin^{-1}\left(\frac{n_g \cdot (L_{term} + \Delta L + 2 \cdot (N-1) \cdot \Delta s) \cdot \lambda_{RF}}{\lambda_{opt} \cdot \Delta d}\right)$$

where $L_{term}$ is the length of the terminal waveguide 126.

Figure 4:
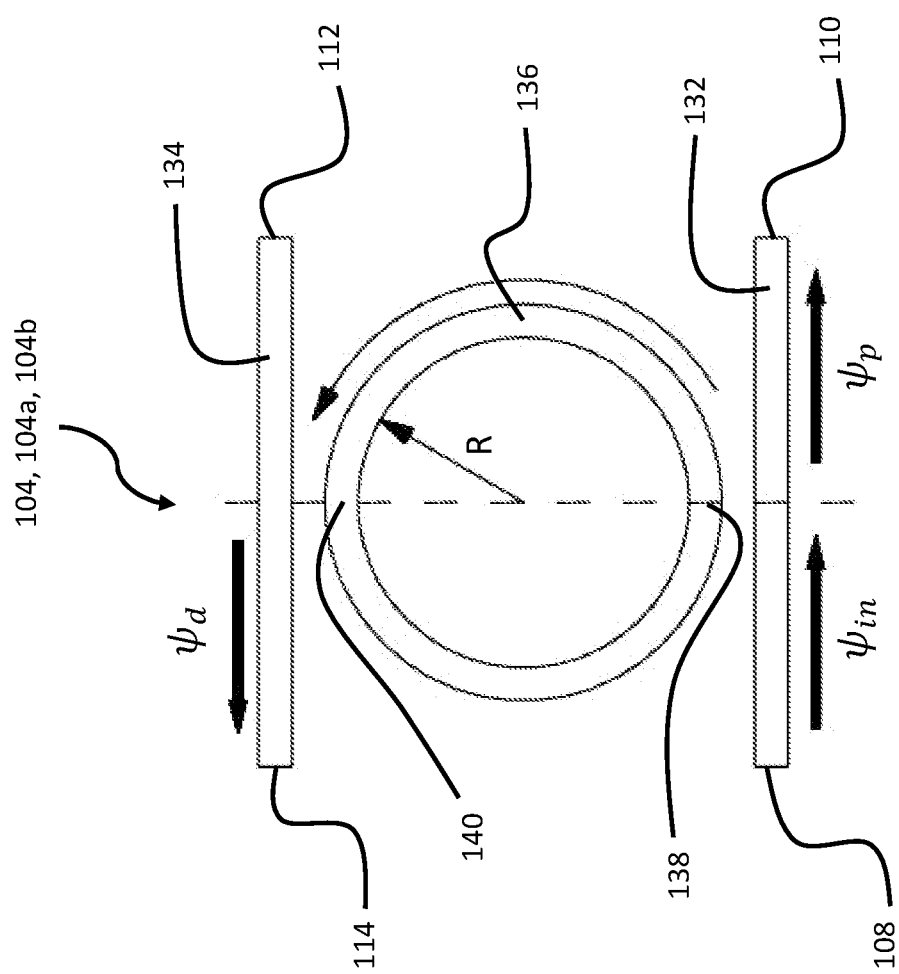
FIG. 4 is a schematic diagram illustrating a four-port micro-ring resonator that is capable of being used with some of the embodiments disclosed herein.

FIGS. 4 and 6A through 6D illustrate the spectral switching operation using a four-port micro-ring resonator 104, 104$a$, 104$b$. FIG. 4 shows a four-port micro-ring resonator 104, 104$a$, 104$b$, and FIGS. 6A through 6D show the normalized spectral response of the fourth port 114 ($T_{drop}$) of the micro-ring resonator, and the normalized spectral response of the second port 110 ($T_{pass}$) of the micro-ring resonator.

The tuning mechanism of the optical time delay in each U-shaped waveguide loop 162 is schematically shown in FIGS. 4 through 6D. The embodiments herein use the spectral filtering and selective optical signal routing capabilities of the four-port micro-ring resonator 104, 104$a$, 104$b$. When the micro-ring resonator is in the OFF mode or state, its resonance wavelength is set to be $\lambda_{off}$. With either thermal or electrical activation of the micro-ring resonator, its resonance wavelength is changed to $\lambda_{on}$ due to the modulation of the effective refractive index of the ring or closed-loop waveguide 136. FIGS. 6A through 6D show the transmission responses of the four-port micro-ring resonator 104, 104$a$, 104$b$ at the drop port or fourth port 114 ($T_{drop}$) and pass port or second port 110 ($T_{pass}$) at the ON and OFF states. The transmission responses are defined by:

$$T_{drop} = \left|\frac{\psi_d}{\psi_{in}}\right|^2, T_{pass} = \left|\frac{\psi_p}{\psi_{in}}\right|^2$$

where $\psi_{in}$ is the optical field entering the first port 108 of the micro-ring resonator, $\psi_d$ is the optical field exiting the fourth port 114 of the micro-ring resonator when it is in the ON state, $\psi_p$ is the optical field exiting the second port 110 of the micro-ring resonator when it is in the OFF state. In this embodiment, the physical dimensions of the micro-ring resonators 104, 104$a$, and 104$b$ are assumed to be identical.

Figure 5:
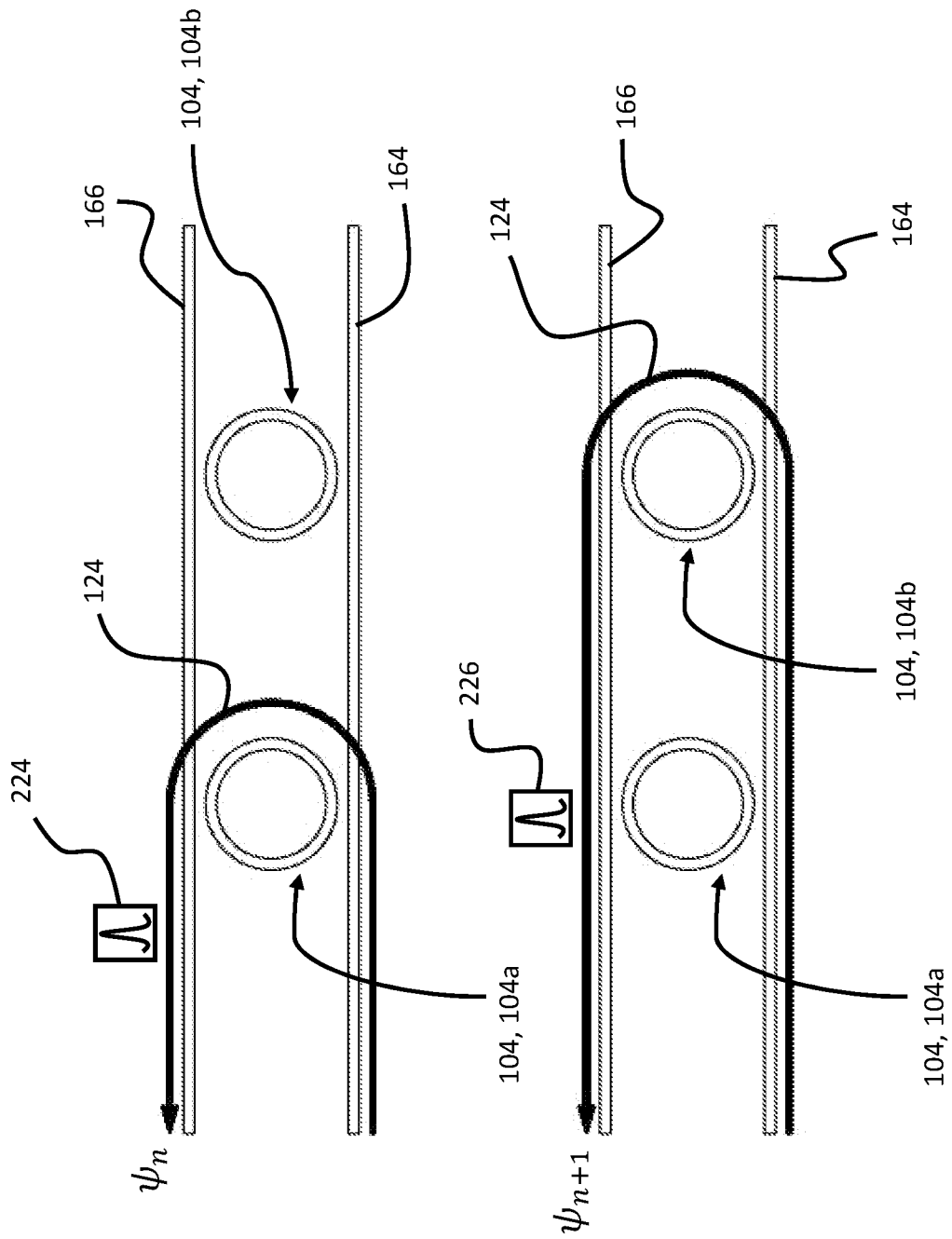
FIG. 5 is a schematic diagram illustrating the selective optical routing mechanism for providing an electrically tunable time delay used in some of the embodiments disclosed herein.
Figure 7A:
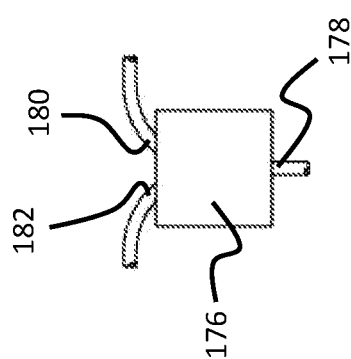
FIGS. 7A through 7C are enlarged schematic diagrams illustrating some of the components used in some of the embodiments disclosed herein.
Figure 7B:
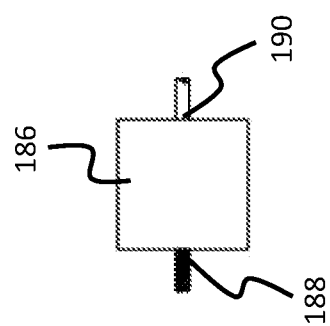
Figure 7C:
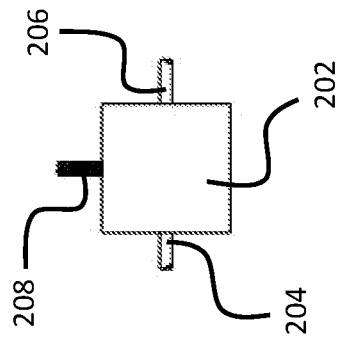

FIG. 5 illustrates the selective optical routing mechanism used in the embodiments herein for providing an electrically tunable time delay. The selective optical routing mechanism uses cascaded micro-ring-resonators 104, 104$a$, 104$b$ that are electrically switchable between the ON and OFF states by switch elements 116. FIG. 5 shows two optical fields 224 and 226 with different time delays due to micro-ring-resonators 104, 104$a$, and 104$b$ at different positions in the corresponding row of micro-ring resonators being in the ON state in each of the corresponding time delay devices 100. The optical field 224, also designated $\psi_n$, is routed through the (n)-th micro-ring resonator 104, 104$a$, and the optical field 226, also designated $\psi_{n+1}$, is routed through the (n+1)-th micro-ring resonator 104, 104$b$. The optical field routed through the (n+1)-th micro-ring resonator has a longer time delay increment compared to the optical field routed through the (n)-th micro-ring resonator.

An RF-modulated optical signal centered at $\lambda_{on}$ will freely propagate past the chain of OFF-state micro-ring resonators 104, 104$a$, and 104$b$ through either leg of the U-shaped waveguide loops 162. When one of the micro-ring resonators 104, 104$a$, and 104$b$ in the chain is changed to ON state, the optical signal will be routed to the drop port or fourth port 144 of the micro-ring resonator, as schematically shown in FIG. 5. Depending on the relative location, or the array position, of the activated micro-ring resonator 104, 104$a$, 104$b$, the optical signal will experience a different time delay. The relative time delay Td of the output fields (e.g. $\psi_n$ and $\psi_{n+1}$ in the figure) routed through adjacent, i.e., closest neighboring, micro-ring resonators 104, 104$a$, 104$b$ is:

$$\tau_d = \frac{2 \cdot n_g \cdot \Delta s}{c}$$

where c is the speed of light in free space. The full-width-at-half-maximum (FWHM) of the optical transmission responses at the drop and pass ports 114 and 110, respectively, should be wide enough to allow undistorted signal transmission of the RF modulated optical signal.

Two-Dimensional Beam Steering

Figure 9:
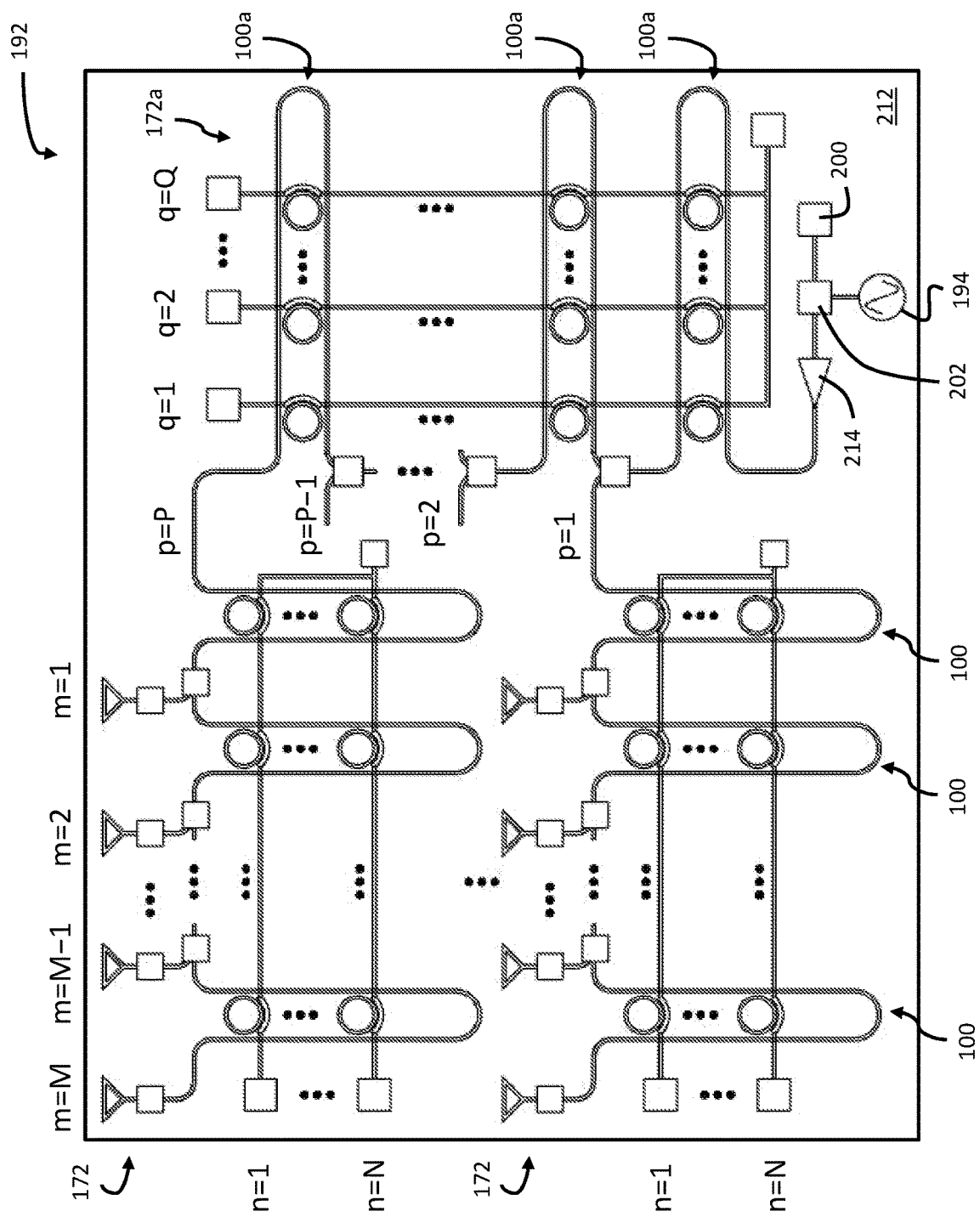
FIG. 9 is a schematic diagram illustrating an electro-optic two-dimensional time delay array device according to some of the embodiments disclosed herein.
Figure 10:
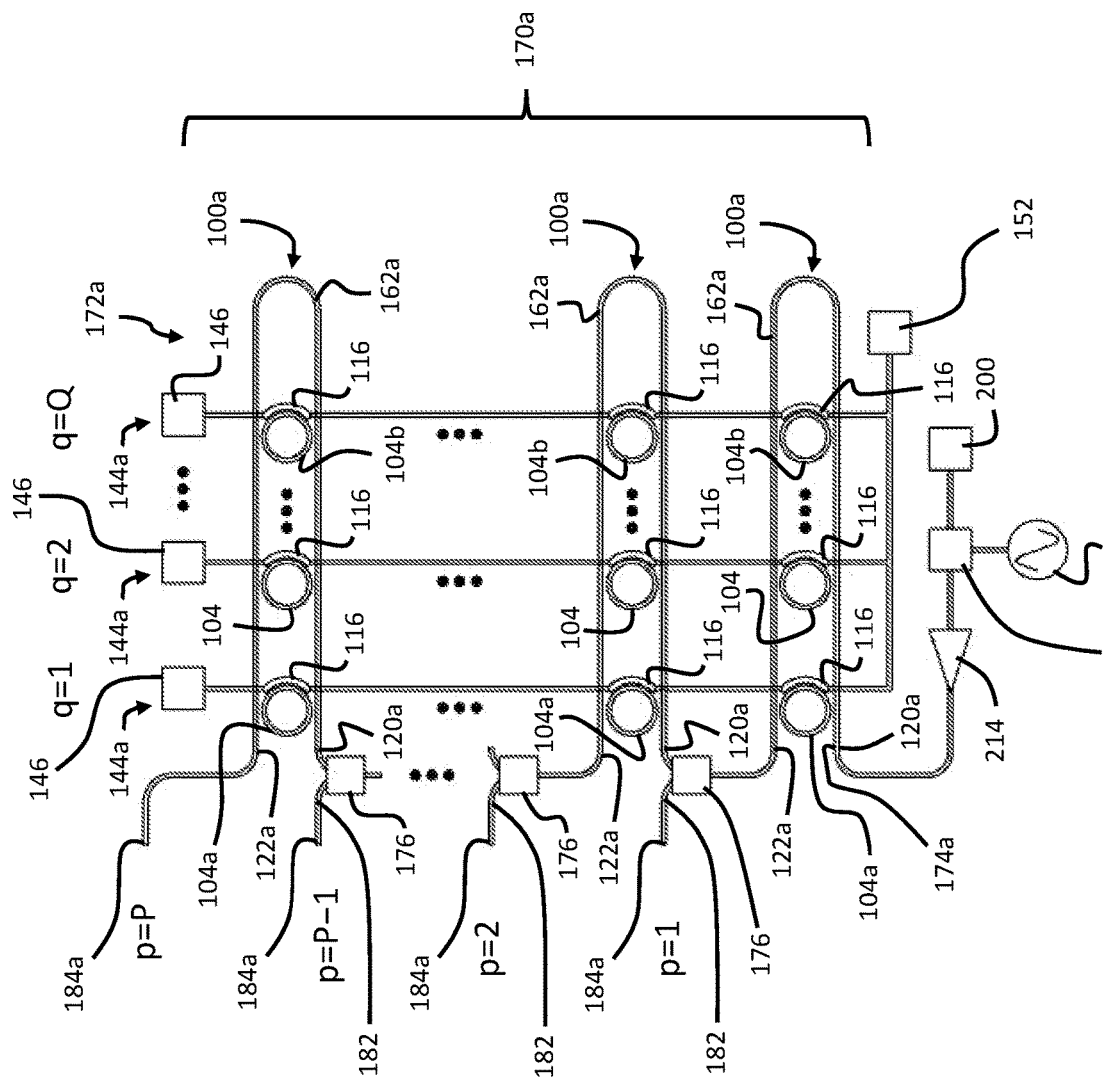
FIGS. 10 and 11 are enlarged fragments of the embodiment of FIG. 9 to more clearly show certain details according to some of the embodiments disclosed herein.
Figure 11:
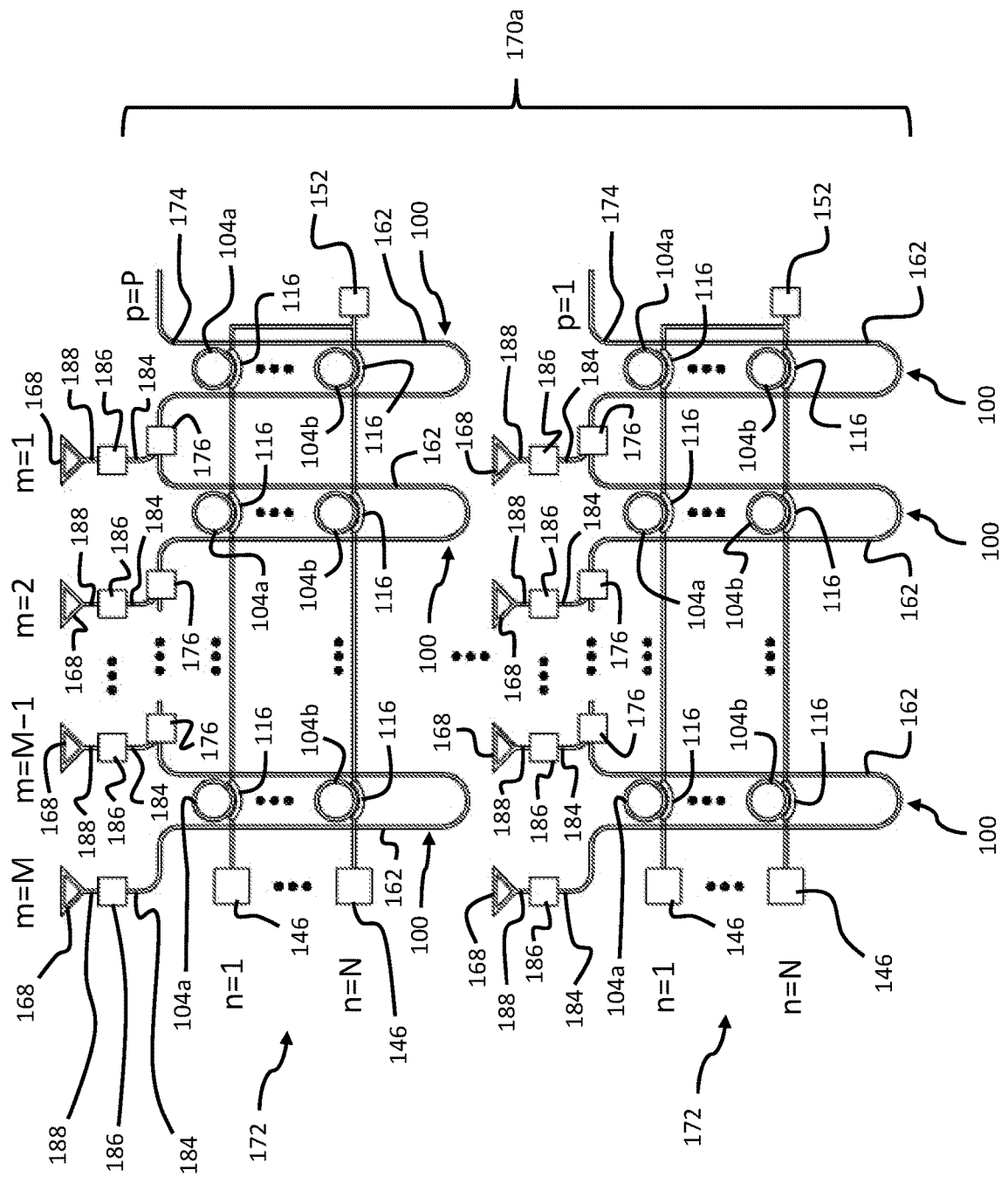

FIGS. 9 through 11 are schematic diagrams illustrating an embodiment for 2-D beam steering, i.e., the electro-optic two-dimensional time delay array device 192, by cascading P the 1-D (1×M) electro-optic cascade devices 172 along the y direction, creating a 2-D (P×M) phased array of antennas 168. RF beam steering in two directions (i.e., horizontal and vertical directions) can be achieved by cascading the 1-D (1×M) electro-optic cascade devices 172 as schematically shown in FIG. 9. This will create a 2-D RF antenna array with tunable optical delay lines. FIGS. 9 through 11 show the schematic diagram of the 2-D beam steering approach. FIGS. 10 and 11 are enlarged fragments of the embodiment of FIG. 9 to more clearly show certain details according to some of the embodiments disclosed herein. As shown, there are M antennas 168 along the x direction, which are supplied with M respective RF signals by a respective 1-D (1×M) electro-optic cascade device 172. The row of M antennas 168, extending in the x direction, is repeated P times along the y direction, creating a 2-D (P×M) array of antennas 168. Each row of M antennas 168, in the (P×M) array of antennas 168, is supplied with M respective RF signals by a respective 1-D (1×M) electro-optic cascade device 172, such that there are P 1-D (1×M) electro-optic cascade devices 172 in the electro-optic two-dimensional time delay array device 192. Using this approach, an RF beam can be steered along the x and y directions. The number of antennas and their spacing in each direction will determine the angular resolution of beam steering. Direction designations x and y are merely for convenience in referring to relative directions and should not be construed as physical limitations unless otherwise specified.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A time delay device for producing a time delay of a time delay increment in an optical signal, the time delay device comprising:

a plurality of four-port switches arranged along a distance in an array, each four-port switch of the plurality of four-port switches comprising a first port, a second port, a third port and a fourth port, there being at least a first four-port switch and a last four-port switch in the array, each of the plurality of four-port switches having an OFF state and an ON state, each of the plurality of four-port switches being configured to place the first port thereof in optical communication with the fourth port thereof at least when it is in the ON state, wherein the time delay device has an input for receiving the optical signal and an output for an optical signal having a time delay to be communicated onward; and at the OFF state, the first port of each four-port switch in the array being in optical communication with the second port of a closest preceding four-port switch in the array except for the first four-port switch in the array, the fourth port of each four-port switch in the array being in optical communication with the third port of the closest preceding four-port switch in the array except for the first four-port switch in the array; and a plurality of electro-optic or heating elements, for each of the plurality of four-port switches there being at least one respective electro-optic or heating element among the plurality of electro-optic or heating elements, each of the plurality of electro-optic or heating elements being configured to operably interact with a respective one of the plurality of four-port switches at least when the electro-optic or heating element is energized by applying an electrical control signal to the electro-optic or heating element, wherein the time delay increment between the optical signal at the input of the time delay device and the optical signal at the output of the time delay device is capable of being selectively varied at least by placing a selected one of the plurality of four-port switches in the ON state while other remaining four-port switches of the plurality of four-port switches are in the OFF state, wherein each of the plurality of four-port switches is adapted to be in the ON state when the electrical control signal is applied to its respective electro-optic or heating element, wherein the optical signal can cross each one of the plurality of four-port switches when it is in the ON state from its first port to its fourth port, wherein the optical signal cannot cross each one of the plurality of four-port switches from its first port to its fourth port when it is in the OFF state but continues on from its first port to its second port, and then, except for the last switch in the array, on to the first port of a closest succeeding four-port switch in the array, wherein the time delay device defines an optical excursion path having an optical path length that is capable of being selectively varied at least by placing a selected one of the plurality of four-port switches in the ON state while other remaining four-port switches of the plurality of four-port switches are in the OFF state, and wherein the time delay increment between the optical signal at the input of the time delay device and the optical signal at the output of the time delay device is capable of being selectively varied at least by placing a selected one of the plurality of four-port switches in the ON state while other remaining four-port switches of the plurality of four-port switches are in the OFF state.

2. The time delay device of claim 1, further comprising: a terminal waveguide connecting the second port and the third port of the last four-port switch in the array such that the time delay device has a base time delay increment between the optical signal at the input of the time delay device and the optical signal at the output of the time delay device corresponding to all of the plurality of four-port switches being in the OFF state.

3. The time delay device of claim 1, wherein at least the input, the output, the plurality of four-port switches, and the plurality of electro-optic or heating elements are integrated on a common substrate to form at least a portion of a chip-scale integrated photonic circuit.

4. The time delay device of claim 1, wherein each of the plurality of four-port switches is a micro-ring resonator with four coupling ports.

5. The time delay device of claim 1, wherein each of the plurality of four-port switches is actuated to be in the ON state by the respective one of the electro-optic or heating elements causing a change to the refractive index of at least a portion of the respective one of the plurality of four-port switches when the electrical control signal is applied to the respective one of the plurality of electro-optic or heating elements.

6. An electro-optic cascade device comprising:
a plurality of time delay devices connected in series by one-by-two optical splitters, each of the plurality of time delay devices being capable of producing a time delay of a time delay increment in an optical signal, each of the plurality of time delay devices comprising:
a plurality of four-port switches arranged along a distance in an array of four-port switches, each four-port switch of the plurality of four-port switches comprising a first port, a second port, a third port and a fourth port, there being at least a first four-port switch and a last four-port switch in the array of four-port switches, the first port of each four-port switch in the array of four-port switches being in optical communication with the second port of a closest preceding four-port switch in the array of four-port switches except for the first four-port switch in the array of four-port switches, the fourth port of each four-port switch in the array of four-port switches being in optical communication with the third port of the closest preceding four-port switch in the array of four-port switches except for the first four-port switch in the array of four-port switches, each of the plurality of four-port switches having an OFF state and an ON state, each of the plurality of four-port switches being configured to place the first port thereof in optical communication with the fourth port thereof at least when it is in the ON state,
wherein the time delay device has an input for receiving the optical signal and an output for the optical signal to be communicated onward; and
a plurality of electro-optic or heating elements, for each of the plurality of four-port switches there being at least one respective electro-optic or heating element among the plurality of electro-optic or heating elements, each of the plurality of electro-optic or heating elements being configured to operably interact with a respective one of the plurality of four-port switches at least when the electro-optic or heating element is energized by applying an electrical control signal to the electro-optic or heating element, wherein the time delay increment between the optical signal at the input of the time delay device and the optical signal at the output of the time delay device is capable of being selectively varied at least by placing a selected one of the plurality of four-port switches in the ON state while other remaining four-port switches of the plurality of four-port switches are in the OFF state,
wherein each of the plurality of four-port switches is adapted to be in the ON state when the electrical control signal is applied to its respective electro-optic or heating element,
wherein the optical signal can cross each one of the plurality of four-port switches when it is in the ON state from its first port to its fourth port,
wherein the optical signal cannot cross each one of the plurality of four-port switches from its first port to its fourth port when it is in the OFF state but continues on from its first port to its second port, and then, except for the last switch in the array of four-port switches, on to the first port of a closest succeeding four-port switch in the array of four-port switches,
wherein each of the plurality of time delay devices is tunable such that it can provide a time delay selected from a respective plurality of time delay increments, wherein the plurality of time delay devices includes a first time delay device and a last time delay device, wherein the plurality of time delay devices are connected in series with the output of each of the plurality of time delay devices, except for the last time delay device, being connected to the input of a closest succeeding one of the plurality of time delay devices to form a cascade.

7. The electro-optic cascade device of claim 6, wherein the number of the plurality of four-port switches is the same in each of the plurality of time delay devices, wherein there are N four-port switches in each of the plurality of time delay devices, wherein N≥2, wherein a four-port switch closest to the input of each time delay device is at position 1 in a corresponding array of four-port switches, which is also the first four-port switch in the corresponding array of four-port switches, wherein a four-port switch at position N in the corresponding array of four-port switches, which is also the last four-port switch in the corresponding array of four-port switches, wherein the plurality of four-port switches in each of the plurality of time delay devices occupy positions 1 through N in the corresponding array of four-port switches, respectively, and wherein the electro-optic cascade device further comprises:
a plurality of electro-optic switching modules, there being a respective electro-optic or heating element for each four-port switch in each of the plurality of time delay devices, each of the plurality of electro-optic or heating elements being positioned and configured for operably interacting with a respective four-port switch from among the plurality of four-port switches of the plurality of time delay devices to selectively switch the respective four-port switch to the ON state,
wherein there are N electro-optic switching modules, wherein there is a respective electro-optic switching module for each of the positions 1 through N of the array of four-port switches in the plurality of time delay devices, wherein each of the N electro-optic switching modules comprises the electro-optic or heating elements for the four-port switches at the corresponding position of the array of four-port switches in the plurality of time delay devices, wherein each of the plurality of electro-optic switching modules further comprises an electric contact pad and a ground connection, wherein all the electro-optic or heating elements for each position in the array of four-port switches in all the plurality of time delay devices are part of a respective electro-optic switching module and the electro-optic or heating elements in the respective electro-optic module are connected in series or in parallel between the corresponding electric contact pad and the corresponding ground connection of the respective electro-optic switching module such that the four-port switches at a selected position in the array of four-port switches in all the plurality of time delay devices are capable of being switched to the ON state at about the same time by placing an electrical control signal on the electric contact pad of the respective electro-optic switching module; and
a ground conductor connecting the ground connection of each of the plurality of electro-optic switching modules to a common ground contact pad for connection to an electrical ground during operation of the electro-optic cascade device.

8. The electro-optic cascade device of claim 7, wherein there are M time delay devices in the plurality of time delay devices, wherein M is a positive integer and M≥2, wherein there is a first time delay device in the cascade occupying position 1 in the cascade when each of the plurality of time delay devices is identified for reference by a respective integer m indicative of the position of each of the plurality of time delay devices in the cascade, wherein 1≤m≤M, wherein the input of the first time delay device serves as the input to the electro-optic cascade device, and wherein the electro-optic cascade device further comprises:

optical signal splitters, there being at least M−1 optical signal splitters in number, wherein an optical signal splitter is provided in optical communication with the output of each time delay device at positions 1 through M−1 in the cascade, wherein each of the optical signal splitters has an input that is connected to the output of a respective time delay device, wherein each of the optical signal splitters has a first output that is connected to the input of a time delay device that is next in order following the respective time delay device, wherein each of the optical signal splitters has a second output that allows access to the optical signal at the output of the respective time delay device for further application, wherein the cascade is capable of providing an array of M optical signals from M outputs, wherein each optical signal in the array of M optical signals has a time delay of a time delay increment Δt relative to an optical signal immediately previous in order in the array of M optical signals, wherein Δt is tunable at least through the use of the plurality of electro-optic switching modules, wherein each optical signal in the array of M optical signals has a time delay of mΔt relative to the optical signal at the input of the first time delay device in the cascade, wherein each optical signal in the array of M optical signals has a respective time delay device, and wherein m is the positive integer indicative of the position of the respective time delay device in the cascade.

9. The electro-optic cascade device of claim 8, wherein each of the plurality of time delay devices further comprises:

a terminal waveguide connecting the second port and the third port of the last four-port switch in a corresponding array of four-port switches of a corresponding time delay device such that the time delay device has a base time delay increment between the optical signal at the input of the time delay device and the optical signal at the output of the time delay device corresponding to all of the plurality of four-port switches in the corresponding array of four-port switches being in the OFF state, wherein Δt is capable of having a value selected from the group consisting of the base time delay increment of any of the plurality of time delay devices and the time delay increments obtainable by switching any one of the four-port switches in any of the time delay devices to the ON state.

10. The electro-optic cascade device of claim 9, comprising an electro-optic two-dimensional time delay array device comprising P M-output electro-optic cascade devices, wherein M is a positive integer and M≥2, wherein P is a positive integer and P≥2, for providing a (P×M) array of time-delayed optical signals from a (P×M) array of time-delayed optical signal outputs, wherein each time-delayed optical signal output in the (P×M) array of time-delayed optical signal outputs has a position in the logical ordering of the (P×M) array of time-delayed optical signal outputs given by the ordered pair (p, m), wherein m and p are positive integers, wherein 1≤m≤M and 1≤p≤P, wherein each of the time delay devices in each of the plurality of M-output electro-optic cascade devices comprises N four-port switches, and wherein N is a positive integer and N≥2, the electro-optic two-dimensional time delay array device further comprising:

a P-output electro-optic cascade device according to claim 9, wherein the P-output electro-optic cascade device has P outputs, wherein the P-output electro-optic cascade device comprises P time delay devices in the cascade thereof, wherein each of the time delay devices in the P-output electro-optic cascade device comprises Q four-port switches, and wherein Q is a positive integer and Q≥2, and wherein each of the P outputs of the P-output electro-optic cascade device has a corresponding time delay device in the cascade of the P-output electro-optic cascade device, wherein each of the time delay devices in the P-output electro-optic cascade device has an output, wherein each of the P outputs of the P-output electro-optic cascade device is formed by the second output of an optical signal splitter if the output of the corresponding time delay device is connected to an optical signal splitter and is otherwise formed by the output of the corresponding time delay device, wherein each of the P outputs of the P-output electro-optic cascade device is connected to the input of a respective one of the M-output electro-optic cascade devices, wherein each of the M-output electro-optic cascade devices comprises M time delay devices each of which has an output such that each of the M-output electro-optic cascade devices has M outputs, wherein p also gives the position in the cascade of the P-output electro-optic cascade device of a respective time delay device, the output of which is connected to the input to a respective one of the M-output electro-optic cascade devices, wherein the M outputs of the M-output electro-optic cascade device that has its input connected to the output of the time delay device at position p of the cascade of the P-output electro-optic cascade device provide the outputs at logical positions (p, 1) through (p, M) in the (P×M) array of time-delayed optical signal outputs.

11. The electro-optic cascade device of claim 10, wherein the electro-optic two-dimensional time delay array device further comprising:

a (P×M) array of photodetectors, wherein each photodetector in the (P×M) array of photodetectors has a position in the logical ordering of the (P×M) array of photodetectors given by the ordered pair (p, m), wherein m and p are positive integers, wherein 1≤m≤M and 1≤p≤P, wherein each photodetector in the (P×M) array of photodetectors has an optical input and a RF output, wherein each photodetector in the (P×M) array of photodetectors receives the output signal of a respective time-delayed optical signal from the (P×M) array of time-delayed optical signal outputs such that the (P×M) array of photodetectors is configured to output a (P×M) array of time-delayed RF signals, wherein each time-delayed RF signal in the (P×M) array of time-delayed RF signals has a position in the logical ordering of the (P×M) array of time-delayed RF signals given by the ordered pair (p, m), wherein the time delay between a time-delayed RF signal at position (p, m) and its neighboring time-delayed RF signals within the range of positions (p±1, m±1) is set by setting the time delay between the respective time-delayed optical signals from the (P×M) array of time-delayed optical signal outputs.

12. The electro-optic cascade device of claim 11, wherein the electro-optic two-dimensional time delay array device forms at least a portion of a chip-scale integrated photonic circuit.

13. The electro-optic cascade device of claim 9, wherein each of the plurality of time delay devices produce an array of M time delayed signals by:
  selecting a time delay between the output of each of the time delay devices and the output of its closest succeeding time delay device from the group consisting of the time delay obtained by all the four-port switches, in each of the time delay devices, being in the OFF state and the time delays obtainable by switching all the four-port switches, at any one of the positions in the array of four-port switches in all the time delay devices, to the ON state; and
  producing the selected time delay between the output of each of the time delay devices and the output of its closest succeeding time delay device by performing an action selected from the group consisting of avoiding the application of an electrical control signal to the electric contact pad of any of the electro-optic switching modules and applying an electrical control signal to the electric contact pad of one of the electro-optic switching modules that corresponds to the four-port switch position, in the array of four-port switches, corresponding to the selected time delay.

14. The electro-optic cascade device of claim 8, wherein each of the plurality of four-port switches is a four-port micro-ring resonator.

15. The electro-optic cascade device of claim 8, further comprising:
  an array of M photodetectors arranged with each photodetector occupying a respective one of position 1 through position M in the array of M photodetectors, each photodetector having an output and an input, each photodetector producing an RF signal at its output responsive to an optical signal received at its input, each of the photodetectors occupying position 1 through position M−1 in the array of M photodetectors communicates with the second output of a respective one of the M−1 optical signal splitters and the photodetector occupying position M in the array of M photodetectors communicates with the output of the last time delay device in the cascade of time delay devices such that array of M photodetectors produces an array of M RF signals, wherein the photodetector in each of position 1 through position M in the array of M photodetectors corresponds to the time delay device in the same position in terms of order in the cascade of time delay devices, wherein each RF signal occupies a respective one of position 1 through position M in the array of M RF signals, and wherein each RF signal in the array of M RF signals has a time delay, relative to an RF signal immediately previous in order in the array of M RF signals, that is settable by setting the time delay between the respective optical signals from the array of M optical signals.

16. The electro-optic cascade device of claim 8, arranged as an electro-optic two-dimensional time delay array device comprising P M-output electro-optic cascade devices, wherein M is a positive integer and M≥2, wherein P is a positive integer and P≥2, for providing a (P×M) array of time-delayed optical signals from a (P×M) array of time-delayed optical signal outputs, wherein each time-delayed optical signal output in the (P×M) array of time-delayed optical signal outputs has a position in the logical ordering of the (P×M) array of time-delayed optical signal outputs given by the ordered pair (p, m), wherein m and p are positive integers, wherein 1≤m≤M and 1≤p≤P, wherein each of the time delay devices in each of the plurality of M-output electro-optic cascade devices comprises N four-port switches, and wherein N is a positive integer and N≥2, the electro-optic two-dimensional time delay array device further comprising:
  a P-output electro-optic cascade device according to claim 8, wherein the P-output electro-optic cascade device has P outputs, wherein the P-output electro-optic cascade device comprises P time delay devices in the cascade thereof, wherein each of the time delay devices in the P-output electro-optic cascade device comprises Q four-port switches, and wherein Q is a positive integer and Q≥2, and wherein each of the P outputs of the P-output electro-optic cascade device has a corresponding time delay device in the cascade of the P-output electro-optic cascade device,
  wherein each of the time delay devices in the P-output electro-optic cascade device has an output, wherein each of the P outputs of the P-output electro-optic cascade device is formed by the second output of an optical signal splitter if the output of the corresponding time delay device is connected to an optical signal splitter and is otherwise formed by the output of the corresponding time delay device,
  wherein each of the P outputs of the P-output electro-optic cascade device is connected to the input of a respective one of the M-output electro-optic cascade devices, wherein each of the M-output electro-optic cascade devices comprises M time delay devices each of which has an output such that each of the M-output electro-optic cascade devices has M outputs,
  wherein p also gives the position in the cascade of the P-output electro-optic cascade device of a respective time delay device, the output of which is connected to the input to a respective one of the M-output electro-optic cascade devices, wherein the M outputs of the M-output electro-optic cascade device that has its input connected to the output of the time delay device at position p of the cascade of the P-output electro-optic cascade device provide the outputs at logical positions (p, 1) through (p, M) in the (P×M) array of time-delayed optical signal outputs.

17. The electro-optic cascade device of claim 16, wherein the electro-optic two-dimensional time delay array device further comprising:
  at least one laser; and
  at least one optical modulator having an optical input, an optical output, and an RF signal input,
  wherein the laser produces an optical laser output that is directed to the optical input of the modulator, wherein a RF signal is supplied to the RF signal input of the modulator to produce a modulated optical signal at the optical output of the modulator, and wherein the optical output of the modulator is connected to the input of the P-output electro-optic cascade device to supply the P-output electro-optic cascade device with a modulated optical signal.

18. The electro-optic cascade device of claim 16, wherein the electro-optic two-dimensional time delay array device further comprising:

a (P×M) array of photodetectors, wherein each photodetector in the (P×M) array of photodetectors has a position in the logical ordering of the (P×M) array of photodetectors given by the ordered pair (p, m), wherein m and p are positive integers, wherein 1≤m≤M and 1≤p≤P, wherein each photodetector in the (P×M) array of photodetectors has an optical input and a RF output, wherein each photodetector in the (P×M) array of photodetectors receives the output signal of a respective time-delayed optical signal from the (P×M) array of time-delayed optical signal outputs such that the (P×M) array of photodetectors is configured to output a (P×M) array of time-delayed RF signals, wherein each time-delayed RF signal in the (P×M) array of time-delayed RF signals has a position in the logical ordering of the (P×M) array of time-delayed RF signals given by the ordered pair (p, m), wherein the time delay between a time-delayed RF signal at position (p, m) and its neighboring time-delayed RF signals within the range of positions (p±1, m±1) is set by setting the time delay between the respective time-delayed optical signals from the (P×M) array of time-delayed optical signal outputs.

19. The electro-optic cascade device of claim 16, wherein the electro-optic two-dimensional time delay array device forms at least a portion of a chip-scale integrated photonic circuit.

20. A method of producing a time delay in an optical signal using a time delay device, the method comprising:
  selecting a time delay between an input of the time delay device and an output of the time delay device from the group consisting of the time delay obtained by all four-port switches of the time delay device being in an OFF state and time delays obtainable by switching any one of the four-port switches to an ON state; and
  producing the selected time delay between the input of the time delay device and the output of the time delay device by performing an action selected from the group consisting of avoiding an application of an electrical control signal to any of electro-optic switch elements of the time delay device and applying the electrical control signal to one of the electro-optic switch elements that corresponds to a four-port coupler corresponding to the selected time delay.

* * * * *